(12) United States Patent
Eswara et al.

(10) Patent No.: US 12,175,797 B2
(45) Date of Patent: Dec. 24, 2024

(54) ERRATIC BEHAVIOR DETECTION IN A VIDEO STREAM

(71) Applicant: Honeywell International Inc., Charlotte, NC (US)

(72) Inventors: Lalitha M. Eswara, Bangalore (IN); Ayan Maiti, West Bengal (IN); Abdhul Ahadh, Kozhikode Kerala (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 373 days.

(21) Appl. No.: 17/683,910

(22) Filed: Mar. 1, 2022

(65) Prior Publication Data

US 2023/0282030 A1 Sep. 7, 2023

(51) Int. Cl.
G06V 40/20 (2022.01)
G06T 7/20 (2017.01)
G06V 20/52 (2022.01)

(52) U.S. Cl.
CPC ........... *G06V 40/20* (2022.01); *G06T 7/20* (2013.01); *G06V 20/52* (2022.01); *G06T 2207/10016* (2013.01); *G06T 2207/30196* (2013.01)

(58) Field of Classification Search
CPC ......... G06V 40/20; G06V 20/52; G06T 7/20; G06T 2207/10016; G06T 2207/30196
See application file for complete search history.

(56) References Cited

U.S. PATENT DOCUMENTS

| | | | |
|---|---|---|---|
| 2014/0119608 A1 | 5/2014 | Lee et al. | |
| 2021/0158685 A1* | 5/2021 | Bernotas | ............... G08B 17/12 |

FOREIGN PATENT DOCUMENTS

| | | | | |
|---|---|---|---|---|
| CN | 102156880 | * | 4/2011 | ............... G06K 9/62 |
| CN | 112085003 A | | 12/2020 | |
| WO | 2021069053 A1 | | 4/2021 | |

OTHER PUBLICATIONS

Abdullah et al; "Multi-Person Tracking and Crowd Behavior Detection via Particles Gradient Motion Descriptor and Improved Enrtopy Classifier," Entropy, 23, 628, 26 pages, 2021.
Khan et al; "Survey of Holistic Crowd Analysis Models," J. Comp. Sci. Comm. 1(1)1-9, 2015.
Zhang et al; "Energy Level-Based Abnormal Crowd Behavior Detection," Sensors, 18, 423, 16 pages, 2018.

(Continued)

*Primary Examiner* — David F Dunphy
(74) *Attorney, Agent, or Firm* — Seager, Tufte & Wickhem, LLP

(57) ABSTRACT

Erratic behavior of one or more people within a video stream may be ascertained by analyzing the video stream to detect one or more people and to determine a measure of size of each of the detected people. A movement speed of each of the detected people is determined, and is normalized with respect to the determined measure of size of that person. An average of the movement speeds of all of the detected people is determined. The average of the movement speeds of all of the detected people is compared to an ambient speed. A determination is made that erratic behavior exists when the average of the movement speeds exceeds the ambient speed by at least a threshold. When a determination is made that erratic behavior exists, an erratic movement alert is outputted.

19 Claims, 16 Drawing Sheets

(56) References Cited

OTHER PUBLICATIONS

Gua et al; "Abnormal Crowd Behavior Detection by Using the Particle Entropy," Optik, vol. 125, Issue 14, pp. 3428-3433, (Abstract Only), Jul. 2014.
Hannah, M. Dee et al., "Crowd behaviour analysis using histograms of motion direction," 2010 17th IEEE International Conference on Image Processing (ICIP 2010); Sep. 26-29, 2010; Hong Kong, China, IEEE, Piscataway, NJ, USA Sep. 26, 2010, pp. 1545-1548, XP031814795, ISBN: 978-1-4244-7992-4.
Guo Shuqiiang et al., "An Analysis Method of Crowd Abnormal Behavior for Video Service Robot," IEEE Access, vol. 7, Dec. 6, 2019, pp. 169577-169585, XP011753409, DOI: 10.1109/ACCESS. 2019.2954544 [retrieved on Dec. 2, 2019].
Extended European Search Report, EP Application No. 23156137.4, European Patent Office, Jul. 13, 2023 (9 pages).

\* cited by examiner

US 12,175,797 B2

ERRATIC BEHAVIOR DETECTION IN A VIDEO STREAM

TECHNICAL FIELD

The present disclosure pertains generally to video processing, and more particularly to detecting erratic behavior in a video stream.

BACKGROUND

Video cameras provide video streams showing a variety of different areas. While some video streams are monitored by a security guard or other professional, many other video streams are not monitored by a security guard or other professional, particularly not live. In some cases, the security console that is used by a security guard has a limited display space such that all of the available video streams cannot be displayed simultaneously. In other instances, some video streams are merely archived in case there is a subsequent need to go back and review footage for a particular area, on a particular day and/or during a particular period of time.

It will be appreciated that early detection of a possible problem is beneficial. For example, being able to detect erratic behavior in people within a particular area or region may be beneficial to quickly detect possible problems, and to raise an alarm or the like to bring the possible problems to the attention of security personnel. The types of possible problems, and what constitutes erratic behavior in a given space, can vary substantially depending on the type of space and other circumstances. Accordingly, a need remains for ways of automatically detecting possible erratic behavior within a space captured by a video stream.

SUMMARY

This disclosure relates generally to video processing, and more particularly to automatically detecting erratic behavior in a video stream. An example may be found in a method of using a computing device having one or more processors to detect erratic behavior of one or more people captured in a video stream of a video camera. The illustrative method includes receiving the video stream and analyzing the video stream to detect one or more people in the video stream. A measure of size in the video stream of each of the detected one or more people is determined. A movement speed of each of the detected one or more people is determined, normalized with respect to the determined measure of size of that person in the video stream. An average of the movement speeds of all of the detected one or more people is determined. The average of the movement speeds of all of the detected one or more people is compared to an ambient speed. A determination is then made that erratic behavior exists when the average of the movement speeds of all of the detected one or more people exceeds the ambient speed by at least a threshold. When a determination is made that erratic behavior exists, an erratic movement alert is outputted.

Another example may be found in a method of using a computing device having one or more processors to detect erratic behavior of one or more objects captured in a video stream of a video camera. The illustrative method includes receiving the video stream and analyzing the video stream to detect one or more objects in the video stream. A movement speed of each of the detected one or more objects is determined in each of a plurality of video frames of the video stream. An average of the movement speeds is determined of all of the detected one or more objects for each of the plurality of video frames of the video stream, resulting in a plurality of frame average movement speeds. A multi-frame moving average speed is determined from two or more of the plurality of frame average movement speeds. An ambient speed is determined that is representative of a typical frame average movement speed based at least in part on at least some of the plurality of frame average movement speeds. The multi-frame moving average speed is compared to the ambient speed. A determination is made that erratic behavior exists when the multi-frame moving average speed exceeds the ambient speed by at least a threshold. An erratic movement alert is outputted when a determination is made that erratic behavior exists.

Another example may be found in a non-transient computer readable medium storing instructions. When the instructions are executed by one or more processors, the one or more processors are caused to receive a video stream and analyze the video stream to detect one or more objects in the video stream. The one or more processors are caused to determine a movement speed of each of the detected one or more objects, learn an ambient speed based at least in part on the movement speeds of all of the detected one or more objects over a learning period of time. For example, learning can happen continuously, such as a last N frames, or a last N frames during a specific time period that may be chosen by the user. The one or more processors are further caused to determine an average of the movement speeds of all of the detected one or more objects over a predetermined period of time. The one or more processors are caused to compare the average of the movement speeds of all of the detected one or more objects over the predetermined period of time to the learned ambient speed, to determine that erratic behavior exists when the average of the movement speeds of all of the detected one or more objects over the predetermined period of time exceeds the learned ambient speed by at least a threshold, and to output an erratic movement alert when a determination is made that erratic behavior exists.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments of the disclosure in connection with the accompanying drawings, in which.

Figure 1:
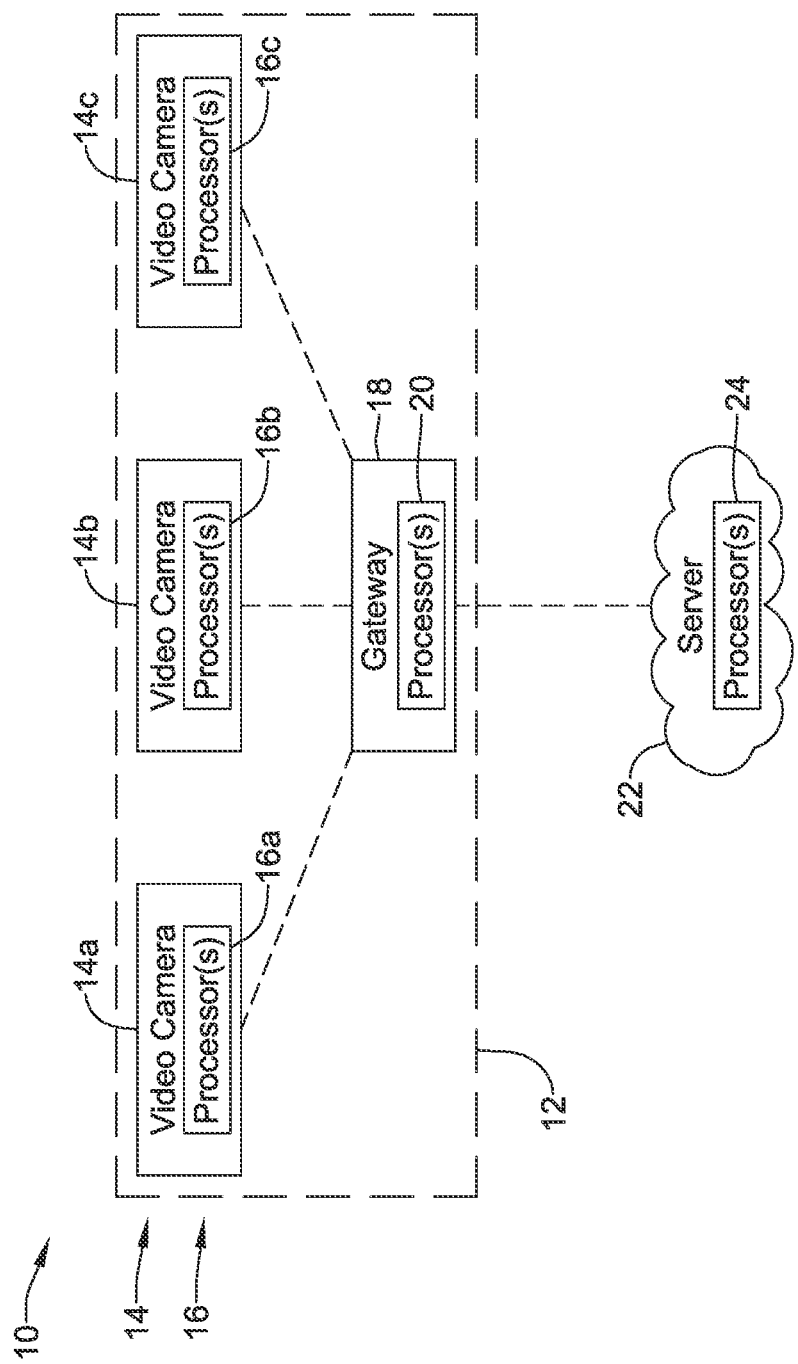
FIG. 1 is a schematic block diagram of an illustrative video surveillance system.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

The term "average" as used herein represents a number or expression expressing the central or typical value in a set of data, in particular the mode, median, or (most commonly) the mean, which is calculated by dividing the sum of the values in the set by their number.

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram of an illustrative video surveillance system 10 that may be installed at a location 12. The location 12 may represent a building or a portion of a building, for example. The location 12 may represent a retail store or a portion of a retail store. The location 12 may represent a street corner, for example, or a bus stop. The location 12 may represent a train or subway station, and thus may be ground level, may be below ground level or may be above ground level. The location 12 may represent a smart city with numerous locations around the smart city. The illustrative video surveillance system 10 includes a number of video cameras 14, individually labeled as 14a, 14b and 14c. While three video cameras 14 are shown, it will be appreciated that this is merely illustrative, as the video surveillance system 10 may include any number of video cameras 14 and in some instances may include dozens of video cameras 14, hundreds of video cameras 14 or even thousands of video cameras 14. In some instances, each video camera 14 includes one or more processors 16, individually labeled as 16a, 16b and 16c. Consequently, each video camera 14 may be considered as including a computing device that can perform at least some video processing within the video camera 14 itself, but this is not required.

In the example shown, each video camera 14 is operably coupled with a gateway 18. The gateway 18 may be considered as being an edge device that is installed at or near the location 12 such that each of the video cameras 14 are able to communicate with the gateway 18. Communication between the gateway 18 and each of the video cameras 14 may include one or more of the video cameras 14 sending video streams to the gateway 18 for video processing, for example, or so that the gateway 18 can send the video streams to a remote device such as a cloud-based server 22. Communication may also include instructions being passed from the gateway 18 to one or more of the video cameras 14, including instructions determined by the gateway 18 as well as instructions determined elsewhere (e.g. a cloud-based server 22) and communicated to the gateway 18.

In the example shown, the gateway 18 includes one or more processors 20, and thus may be considered as including (or being) a computing device that can perform at least some video processing within the gateway 18. The gateway 18 may provide instructions to one or more of the video cameras 14, particularly when one or more of the video cameras 14 are pan tilt zoom (PTZ) cameras that can adjust their field of view (FOV) by changing one or more of the pan, the tilt or the zoom level of the particular video camera 14. If the gateway 18, in analyzing video provided by one of the video cameras 14, detects possible activity that is near the edge of the FOV, the gateway 18 or a remote device communicating with the gateway 18 may instruct the particular video camera 14 to pan, tilt or zoom in order to change its FOV in order to better capture the possible activity. At least some of the video cameras 14 may have a wired connection with the gateway 18. At least some of the video cameras 14 may have a wireless connection with the gateway 18.

In some instances, the gateway 18 provides each of the video cameras 14 with a way to communicate with remote devices. In some cases, the gateway 18 allows each of the video cameras 14 to communicate with a cloud-based server 22. Communication between the gateway 18 and the cloud-based server 22 may include sending video streams to the cloud-based server 22 for analysis, for example. Alternatively, or in addition, communication between the gateway 18 and the cloud-based server 22 may include sending meta data that is extracted from the video streams by the video cameras 14 and/or the gateway 18 to the cloud-based server 22 for analysis, for example. Communication between the gateway 18 and the cloud-based server 22 may include instructions being sent back down to the gateway 18. This can include instructions that instruct the gateway 18 and/or one or more of the video cameras 14 to take particular action. This can include instructions that are received by the gateway 18 and subsequently communicated from the gateway 18 to one or more of the video cameras 14.

While FIG. 1 shows a single gateway 18 communicating with the cloud-based server 22, it will be appreciated that in some cases there may be any number of different gateways 18 communicating with the cloud-based server 22. For example, if there are a dozen buildings that include video surveillance systems communicating with the cloud-based server 22, each of the dozen buildings may include their own gateway 18. In some cases, a large building may be divided into zones, and each zone may have its own gateway 18. For outdoor video cameras, perhaps there is a unique gateway 18 that is connected to all of the video cameras on a particular block, for example. In some cases, each video camera may have its own gateway.

In the example shown, the cloud-based server 22 includes one or more processors 24, and thus the cloud-based server 22 may be considered as being a computing device. In some cases, the cloud-based server 22 performs at least some of the video analysis being performed on the video streams provided by the video cameras 14. Video analysis may include any of a variety of different processes and techniques, and in some instances may include looking for possible erratic behavior of people or other objects (e.g. vehicles, animals, etc.) detected within the video streams. In some cases, the gateway 18 performs at least some of the video analysis being performed on the video streams provided by the video cameras 14. In some cases, at least some of the video analysis may be performed by the video cameras 14 themselves.

Figure 2:
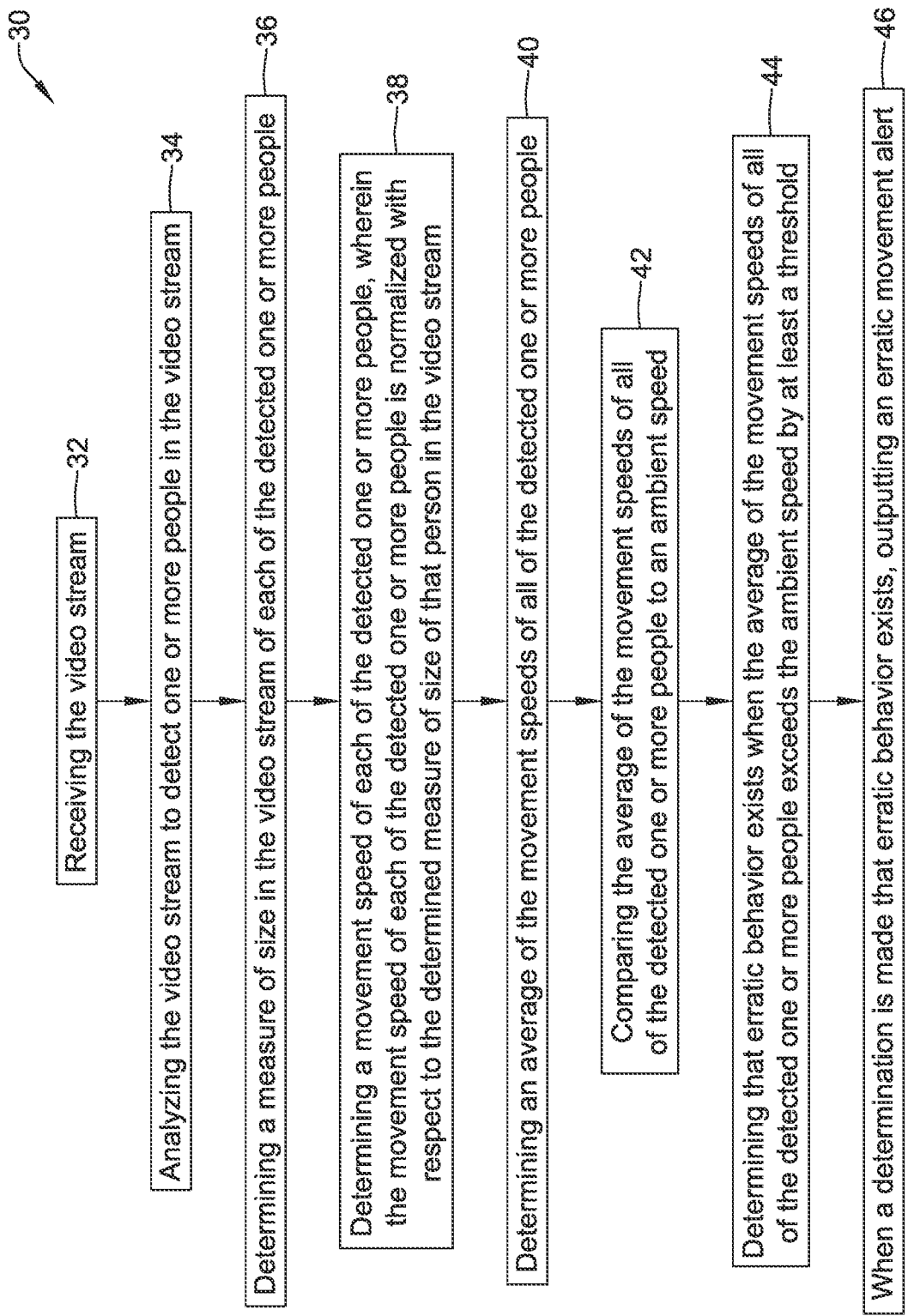
FIG. 2 is a flow diagram showing an illustrative method.

FIG. 2 is a flow diagram showing an illustrative method 30 of using a computing device having one or more processors to detect erratic behavior of one or more people (or other objects) captured in a video stream of a video camera (such as the video cameras 14). The illustrative method 30 may be carried out via any of the one or more processors 16 within each of the video cameras 14, via the one or more processors 20 within the gateway 18 and/or via the one or more processors 24 within the cloud-based server 22. In some instances, the illustrative method 30 may be distributed between two or more of the video cameras 14, the gateway 18 and the cloud-based server 22. In some cases, less intensive video processing, requiring less computing power, may be performed within one or more of the video cameras 14. In some cases, two or more video cameras 14 may work together to process a video stream provided by one of the video cameras 14, for example. In some cases, more intensive video processing, requiring additional computing power, may be performed either within the gateway 18 or the cloud-based server 22. The gateway 18 and/or the cloud-based server 22 may be configured to optimize efficiency by controlling what video processing is performed by what processors. In some cases, meta data may be extracted from video streams and passed to other devices for further processing and/or analysis.

The illustrative method 30 includes receiving a video stream, as indicated at block 32. Receiving the video stream may simply include the one or more processors 16 of the particular video camera 14 receiving the video stream provided by that video camera 14, or perhaps provided by another video camera 14 if the two video cameras 14 are load-sharing. Receiving the video stream may include the gateway 18 receiving the video stream captured by a video camera, or perhaps the cloud-based server 22 receiving the video stream.

The video stream is analyzed to detect one or more people in the video stream, as indicated at block 34. In some cases, the video camera has a field of view, and analyzing the video stream to detect one or more people in the video stream may include identifying a region of interest in the FOV of the video stream, wherein the region of interest corresponds to less than the entire field of view (FOV) of the video camera, and detecting one or more people in the region of interest of the video stream while not detecting people that are not in the region of interest of the video stream. A measure of size in the video stream of each of the detected one or more people is determined, as indicated at block 36. In some instances, the video stream includes a plurality of video frames, wherein each video frame includes a plurality of pixels, and determining the measure of size in the video stream of each of the detected one or more people includes determining a number of pixels that correspond to the corresponding person. In some cases, a bounding box is determined for each of the people in the video stream, and the measure of size in the video stream of each of the detected one or more people includes determining a number of pixels that correspond to the bounding box of the corresponding person. These are just examples.

A movement speed of each of the detected one or more people is determined, wherein the movement speed of each of the detected one or more people is normalized with respect to the determined measure of size of that person in the video stream, as indicated at block 38. The measure of size of each person may on average represent a distance that the person is from the video camera in the space. For the same detected movement speed (e.g. pixels moved per video frame), a person far away from the video camera (and thus having a smaller size in the FOV of the video stream) will be moving at a faster rate in the space than a person that is close to the video camera (and thus having a larger size in the FOV of the video stream).

In some instances, the video stream includes a plurality of video frames and each video frame includes a plurality of pixels, and determining the movement speed of each of the detected one or more people in the video stream may include determining a measure of distance of movement (e.g. pixels moved) of the corresponding person from a first video frame to a second video frame of the video stream, wherein a time between when the first video frame was captured and when the second video frame was captured is known (e.g. known Frames-Per-Second).

In some cases, the measure of distance of movement may be expressed as a number of pixels that the corresponding person has moved from the first video frame to the second video frame. Determining the measure of size of each of the detected one or more people in the video stream may include determining a number of pixels that correspond to the corresponding person, and wherein the determined movement speed of each of the detected one or more people is normalized with respect to the number of pixels that correspond to that person.

An average of the movement speeds of all of the detected one or more people is determined, as indicated at block 40. The average of the movement speeds of all of the detected one or more people is compared to an ambient speed, as indicated at block 42. The ambient speed may, for example, be learned over time based at least in part on the average of the movement speeds of all of the detected one or more people over a plurality of video frames of the video stream over a learned period of time.

A determination is made that erratic behavior exists when the average of the movement speeds of all of the detected one or more people exceeds the ambient speed by at least a threshold, as indicated at block 44. In some cases, the threshold is time and/or location dependent, and may change over time. When a determination is made that erratic behavior exists, an erratic movement alert is outputted, as indicated at block 46. An erratic movement alert may include a visual or audible alert for a person who is responsible for monitoring the video streams. An erratic movement alert may include superimposing a live video clip of the possible erratic behavior atop the person's screen so that they are immediately made aware of it. An erratic movement alert may include notifying the authorities, and possible dispatching the authorities to the location of the detected erratic behavior.

In some cases, outputting an erratic movement alert may cause one or more of adjusting a FOV of a video camera, prioritizing a video console to show the video stream that shows the erratic behavior, sending at least part of the video stream that includes the erratic behavior to a cloud server for further video processing (e.g. facial recognition, enhanced motion analysis, image enhancement, etc.) and/or archiving, and sending metadata associated with the erratic behavior to the cloud server.

Figure 3:
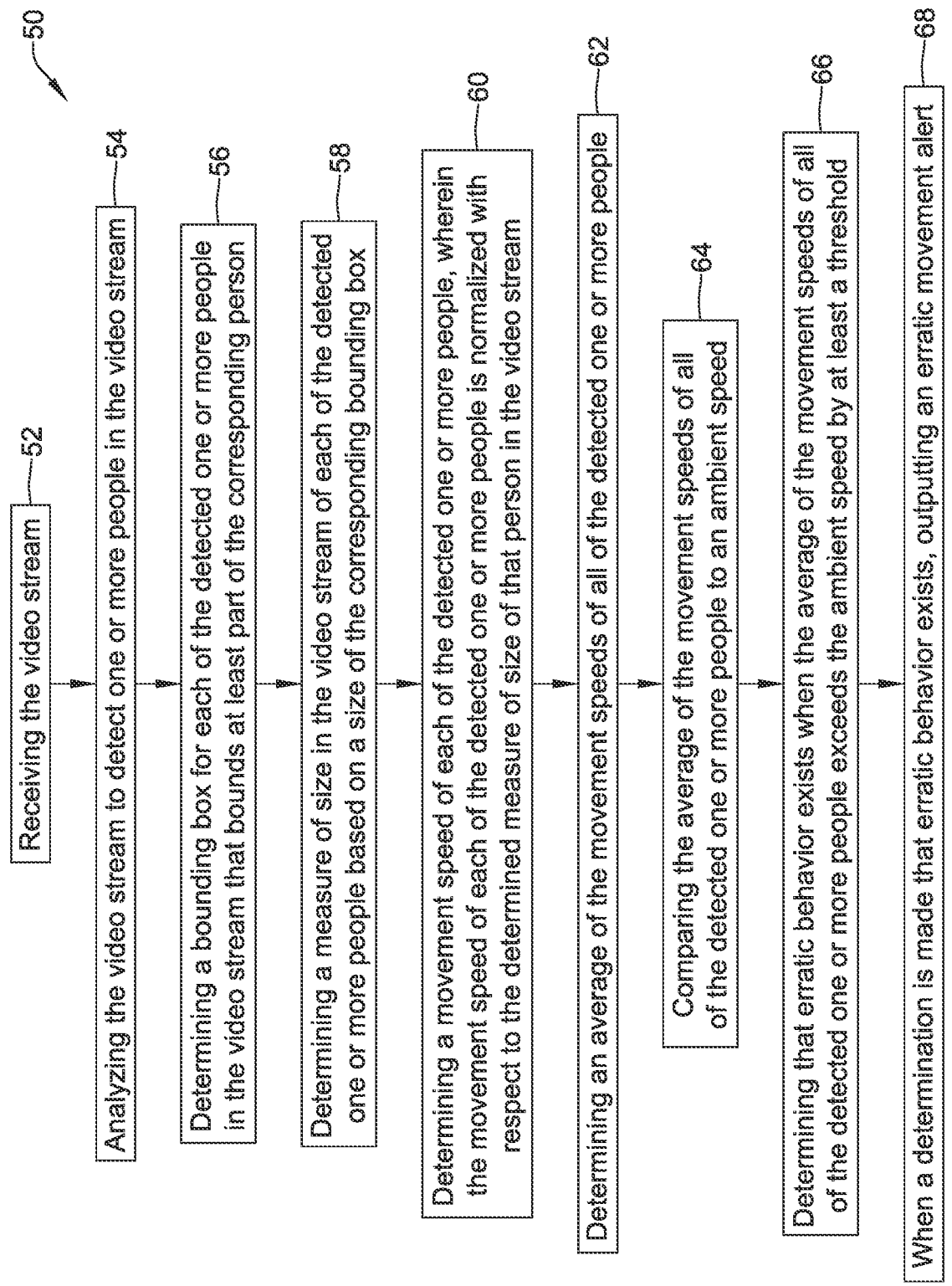
FIG. 3 is a flow diagram showing an illustrative method.

FIG. 3 is a flow diagram showing an illustrative method 50 of using a computing device having one or more processors to detect erratic behavior of one or more people captured in a video stream of a video camera (such as the video cameras 14). The method 50 may be carried out via any of the one or more processors 16 within each of the video cameras 14, via the one or more processors 20 within the gateway 18 and/or via the one or more processors 24 within the cloud-based server 22. In some instances, the method 50 may be distributed between two or more of the video cameras 14, the gateway 18 and the cloud-based server 22. In some cases, less intensive video processing, requiring less computing power, may be performed within one or more of the video cameras 14. In some cases, two or more video cameras 14 may work together to process a video stream provided by one of the video cameras 14, for example. In some cases, more intensive video processing, requiring additional computing power, may be performed either within the gateway 18 or the cloud-based server 22. The gateway 18 and/or the cloud-based server 22 may be configured to optimize efficiency by controlling what video processing is performed by what processors.

The illustrative method 50 includes receiving the video stream, as indicated at block 52. Receiving the video stream may simply include the one or more processors 16 of the particular video camera 14 receiving the video stream provided by that video camera 14, or perhaps provided by another video camera 14 if the two video cameras 14 are load-sharing. Receiving the video stream may include the gateway 18 receiving the video stream, or perhaps the cloud-based server 22 receiving the video stream.

The video stream is analyzed to detect one or more people in the video stream, as indicated at block 54. In some cases, the video camera has a field of view, and analyzing the video stream to detect one or more people in the video stream may include identifying a region of interest in the video stream, wherein the region of interest corresponds to less than the entire field of view of the video camera, and detecting one or more people in the region of interest of the video stream while not detecting people that are not in the region of interest of the video stream.

A bounding box may be determined for each of the detected one or more people in the video stream, where the bounding box bounds at least part of the corresponding person, as indicated at block 56. A measure of size in the video stream of each of the detected one or more people may be based on a size of their corresponding bounding box, as indicated at block 58. The bounding box dimensions may be based on any arbitrary unit of measure, and in some cases can include a number of pixels.

A movement speed of each of the detected one or more people is determined, wherein the movement speed of each of the detected one or more people is normalized with respect to the determined measure of size of that person in the video stream, as indicated at block 60. In some instances, the video stream includes a plurality of video frames and each video frame includes a plurality of pixels, and determining the movement speed of each of the detected one or more people in the video stream may include determining a measure of distance of movement (e.g. pixels moved) of the corresponding person from a first video frame to a second video frame of the video stream, wherein a time between when the first video frame was captured and when the second video frame was captured is known (e.g. known Frames-Per-Second).

In some cases, the measure of distance of movement may be expressed as a number of pixels that the corresponding person has moved from the first video frame to the second video frame. Determining the measure of size of each of the detected one or more people in the video stream may include determining a number of pixels that correspond to the corresponding person, and wherein the determined movement speed of each of the detected one or more people is normalized with respect to the number of pixels that correspond to that person.

An average of the movement speeds of all of the detected one or more people is determined, as indicated at block 62. The average of the movement speeds of all of the detected one or more people is compared to an ambient speed, as indicated at block 64. The ambient speed may, for example, be learned over time based at least in part on the average of the movement speeds of all of the detected one or more people determined over a plurality of video frames of the video stream over a learned period of time.

A determination is made that erratic behavior exists when the average of the movement speeds of all of the detected one or more people exceeds the ambient speed by at least a threshold, as indicated at block 66. In some cases, the threshold is time and/or location dependent, and may change over time. When a determination is made that erratic behavior exists, an erratic movement alert is outputted, as indicated at block 68. An erratic movement alert may include a visual or audible alert for a person who is responsible for monitoring the video streams. An erratic movement alert may include superimposing a live video clip of the possible erratic behavior atop the person's screen so that they are immediately made aware of it. An erratic movement alert may include notifying the authorities, and possible dispatching the authorities to the location of the detected erratic behavior.

In some cases, outputting an erratic movement alert may cause one or more of adjusting a FOV of a video camera, prioritizing a video console to show the video stream that shows the erratic behavior, sending at least part of the video stream that includes the erratic behavior to a cloud server for further video processing (e.g. facial recognition, enhanced motion analysis, image enhancement, etc.) and/or archiving, and sending metadata associated with the erratic behavior to the cloud server.

Figure 4:
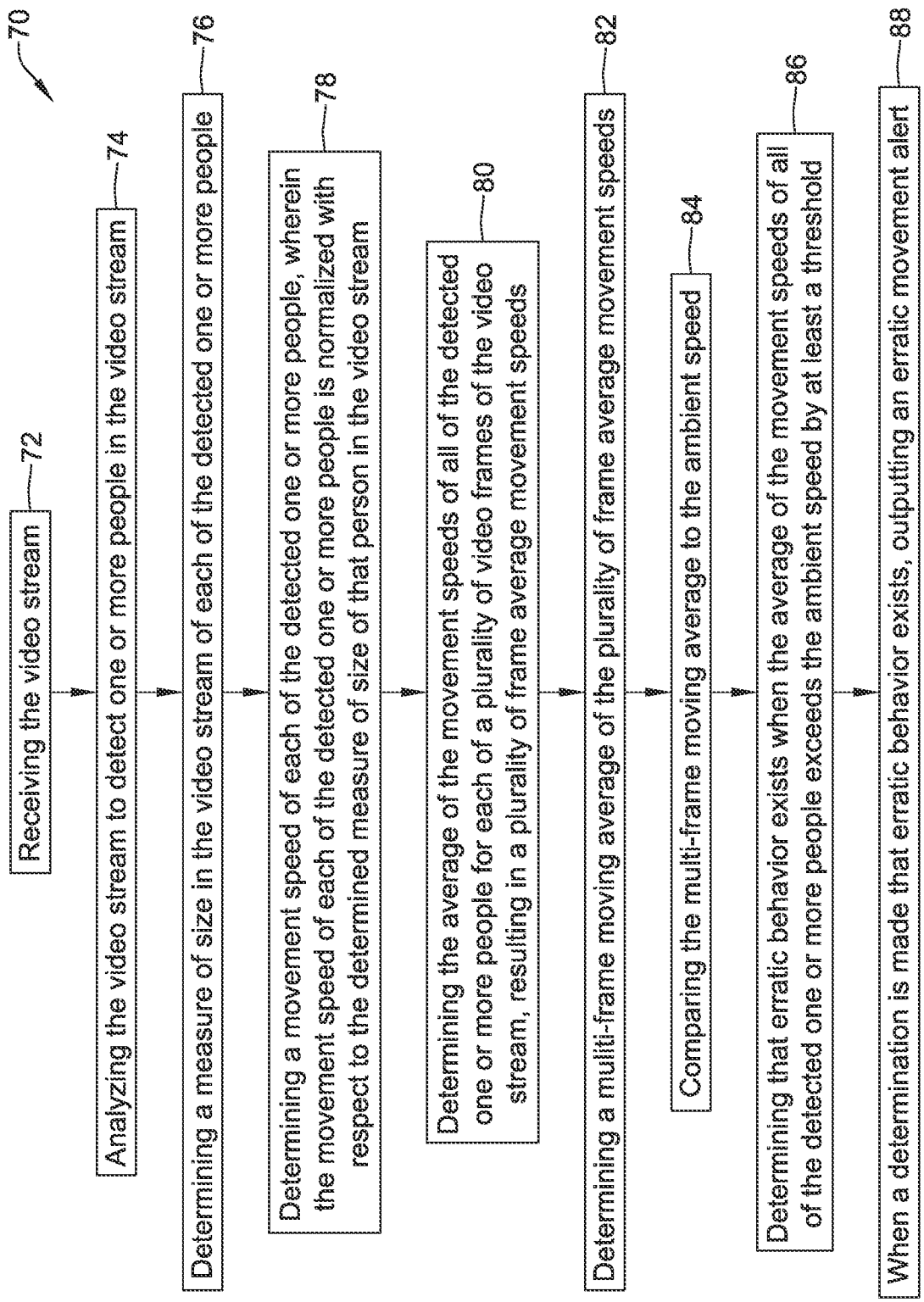
FIG. 4 is a flow diagram showing an illustrative method.

FIG. 4 is a flow diagram showing an illustrative method 70 of using a computing device having one or more processors to detect erratic behavior of one or more people captured in a video stream of a video camera (such as the video cameras 14). The illustrative method 70 may be carried out via any of the one or more processors 16 within each of the video cameras 14, via the one or more processors 20 within the gateway 18 and/or via the one or more processors 24 within the cloud-based server 22. In some instances, the method 70 may be distributed between two or more of the video cameras 14, the gateway 18 and the cloud-based server 22. In some cases, less intensive video processing, requiring less computing power, may be performed within one or more of the video cameras 14. In some cases, two or more video cameras 14 may work together to process a video stream provided by one of the video cameras 14, for example. In some cases, more intensive video processing, requiring additional computing power, may be performed either within the gateway 18 or the cloud-based server 22. The gateway 18 and/or the cloud-based server 22 may be configured to optimize efficiency by controlling what video processing is performed by what processors.

The illustrative method 70 includes receiving the video stream, as indicated at block 72. Receiving the video stream may simply include the one or more processors 16 of the particular video camera 14 receiving the video stream provided by that video camera 14, or perhaps provided by another video camera 14 if the two video cameras 14 are load-sharing. Receiving the video stream may include the gateway 18 receiving the video stream, or perhaps the cloud-based server 22 receiving the video stream.

The video stream is analyzed to detect one or more people in the video stream, as indicated at block 74. In some cases, the video camera has a field of view (FOV), and analyzing the video stream to detect one or more people in the video stream may include identifying a region of interest in the video stream, wherein the region of interest corresponds to less than the entire field of view (FOV) of the video camera, and detecting one or more people in the region of interest of the video stream while not detecting people that are not in the region of interest of the video stream. A measure of size in the video stream of each of the detected one or more people is determined, as indicated at block 76. In some instances, the video stream includes a plurality of video frames, wherein each video frame includes a plurality of pixels, and determining the measure of size in the video stream of each of the detected one or more people includes determining a number of pixels that correspond to the corresponding person.

A movement speed of each of the detected one or more people is determined, wherein the movement speed of each of the detected one or more people is normalized with respect to the determined measure of size of that person in the video stream, as indicated at block 78. In some instances, the video stream includes a plurality of video frames and each video frame includes a plurality of pixels, and determining the movement speed of each of the detected one or more people in the video stream may include determining a measure of distance of movement (e.g. pixels moved) of the corresponding person from a first video frame to a second video frame of the video stream, wherein a time between when the first video frame was captured and when the second video frame was captured is known (e.g. known Frames-Per-Second).

In some cases, the measure of distance of movement may be expressed as a number of pixels that the corresponding person has moved from the first video frame to the second video frame. Determining the measure of size of each of the detected one or more people in the video stream may include determining a number of pixels that correspond to the corresponding person, and wherein the determined movement speed of each of the detected one or more people is normalized with respect to the number of pixels that correspond to that person.

An average of the movement speeds of all of the detected one or more people is determined for each of a plurality of video frames of the video stream, resulting in a plurality of frame average movement speeds, as indicated at block 80. A multi-frame moving average of the plurality of frame average movement speeds is determined, as indicated at block 82. The multi-frame moving average is compared to an ambient speed, as indicated at block 84. The ambient speed may, for example, be learned over time based at least in part on the average of the movement speeds of all of the detected one or more people determined over a plurality of video frames of the video stream over a learned period of time.

A determination is made that erratic behavior exists when the average of the movement speeds of all of the detected one or more people exceeds the ambient speed by at least a threshold, as indicated at block 86. In some cases, the threshold is time and/or location dependent, and may change over time. When a determination is made that erratic behavior exists, an erratic movement alert is outputted, as indicated at block 88. An erratic movement alert may include a visual or audible alert for a person who is responsible for monitoring the video streams. An erratic movement alert may include superimposing a live video clip of the possible erratic behavior atop the person's screen so that they are immediately made aware of it. An erratic movement alert may include notifying the authorities, and possible dispatching the authorities to the location of the detected erratic behavior.

In some cases, outputting an erratic movement alert may cause one or more of adjusting a FOV of a video camera, prioritizing a video console to show the video stream that shows the erratic behavior, sending at least part of the video stream that includes the erratic behavior to a cloud server for further video processing (e.g. facial recognition, enhanced motion analysis, image enhancement, etc.) and/or archiving, and sending metadata associated with the erratic behavior to the cloud server.

Figure 5A:
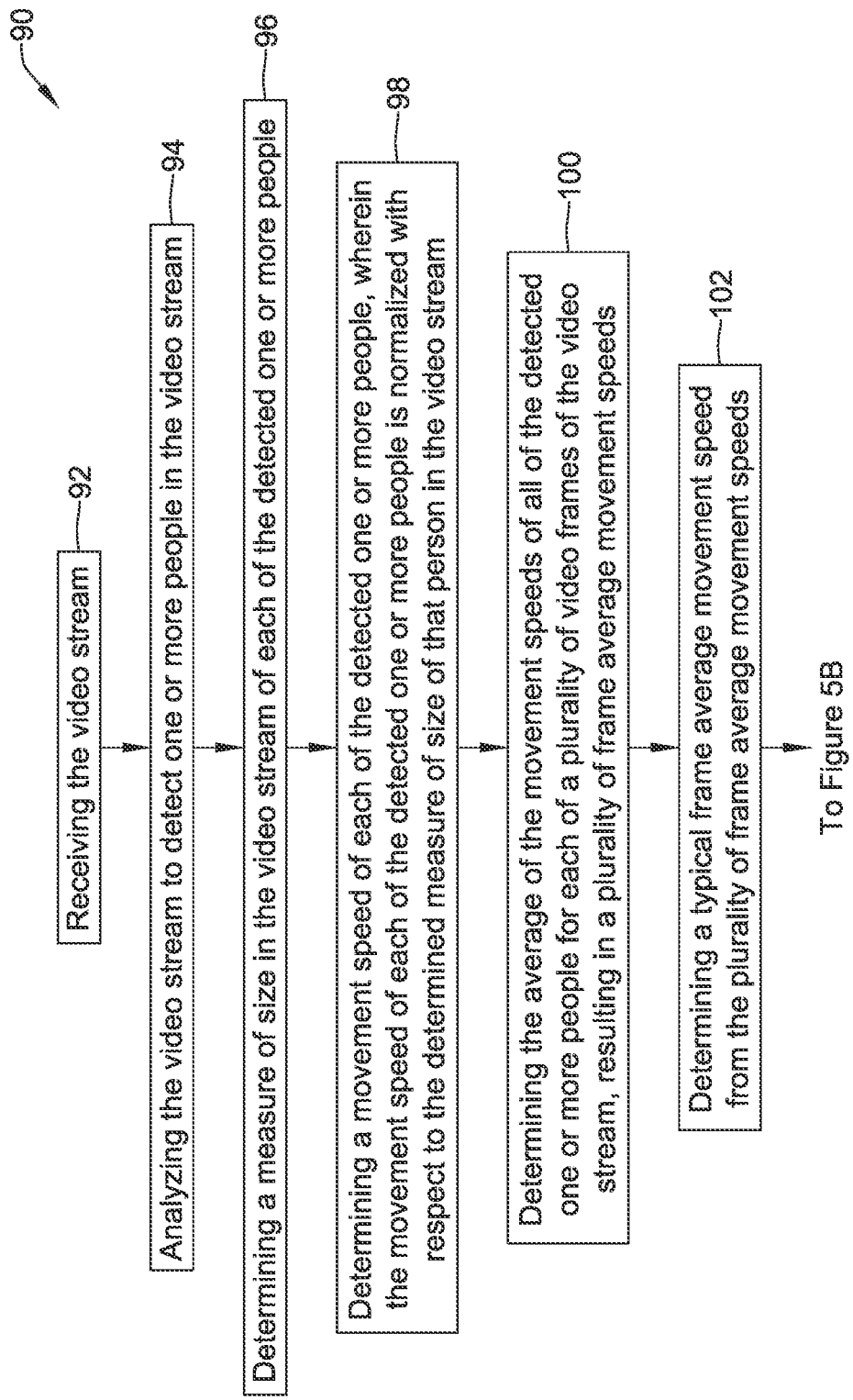
FIGS. 5A and 5B together are a flow diagram showing an illustrative method.
Figure 5B:
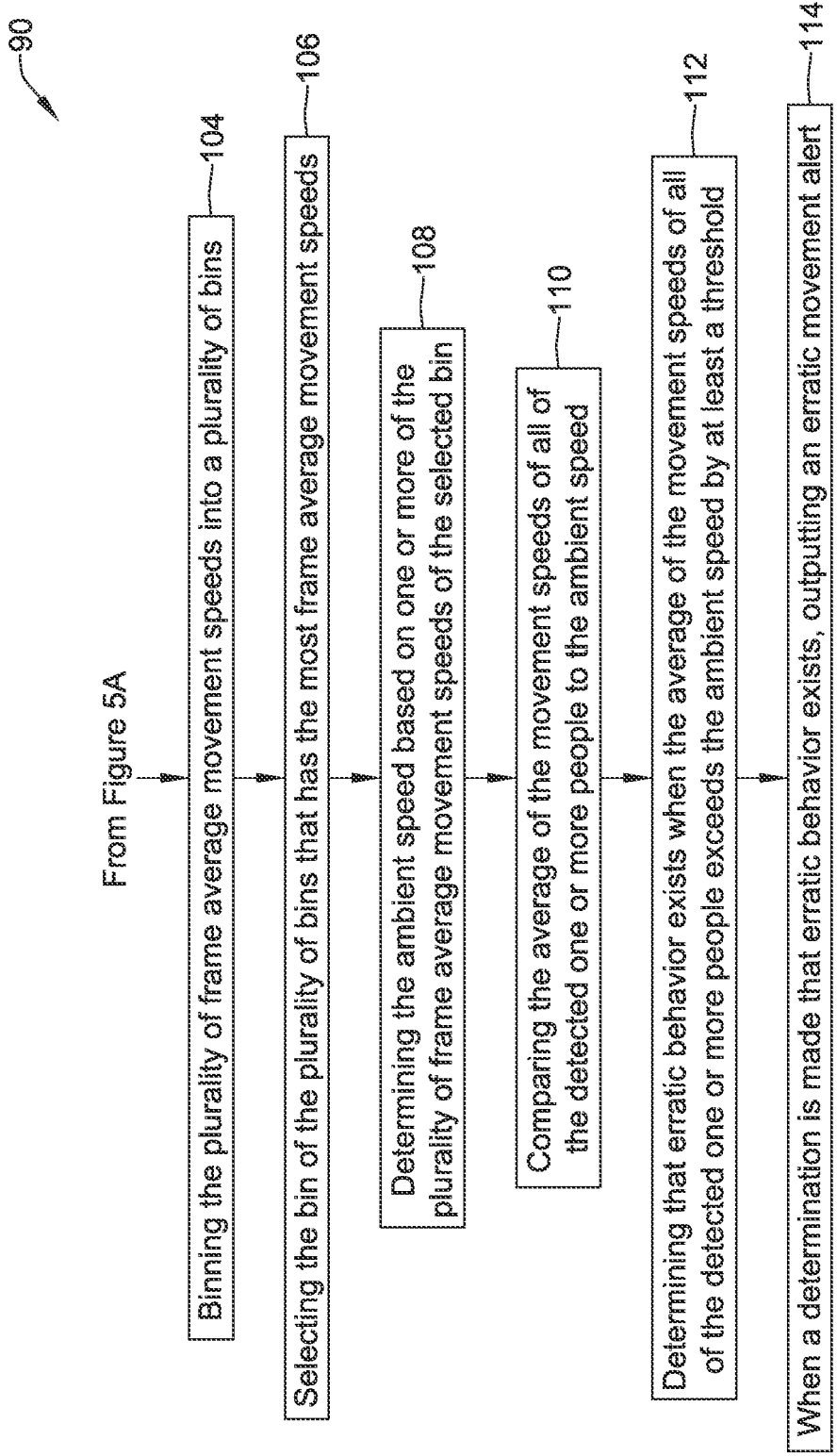

FIGS. 5A and 5B together are a flow diagram showing an illustrative method 90 of using a computing device having one or more processors to detect erratic behavior of one or more people captured in a video stream of a video camera (such as the video cameras 14). The illustrative method 90 may be carried out via any of the one or more processors 16 within each of the video cameras 14, via the one or more processors 20 within the gateway 18 and/or via the one or more processors 24 within the cloud-based server 22. In some instances, the method 90 may be distributed between two or more of the video cameras 14, the gateway 18 and the cloud-based server 22. In some cases, less intensive video processing, requiring less computing power, may be performed within one or more of the video cameras 14. In some cases, two or more video cameras 14 may work together to process a video stream provided by one of the video cameras 14, for example. In some cases, more intensive video processing, requiring additional computing power, may be performed either within the gateway 18 or the cloud-based server 22. The gateway 18 and/or the cloud-based server 22 may be configured to optimize efficiency by controlling what video processing is performed by what processors.

Starting with FIG. 5A, the illustrative method 90 includes receiving the video stream, as indicated at block 92. Receiving the video stream may simply include the one or more processors 16 of the particular video camera 14 receiving the video stream provided by that video camera 14, or perhaps provided by another video camera 14 if the two video cameras 14 are load-sharing. Receiving the video stream may include the gateway 18 receiving the video stream, or perhaps the cloud-based server 22 receiving the video stream.

The video stream is analyzed to detect one or more people in the video stream, as indicated at block 94. In some cases, the video camera has a field of view (FOV), and analyzing the video stream to detect one or more people in the video stream may include identifying a region of interest in the video stream, wherein the region of interest corresponds to less than the entire field of view (FOV) of the video camera, and detecting one or more people in the region of interest of the video stream while not detecting people that are not in the region of interest of the video stream. A measure of size in the video stream of each of the detected one or more people is determined, as indicated at block 96. In some instances, the video stream includes a plurality of video frames, wherein each video frame includes a plurality of pixels, and determining the measure of size in the video stream of each of the detected one or more people includes determining a number of pixels that correspond to the corresponding person.

A movement speed of each of the detected one or more people is determined, wherein the movement speed of each of the detected one or more people is normalized with respect to the determined measure of size of that person in the video stream, as indicated at block 98. In some instances, the video stream includes a plurality of video frames and each video frame includes a plurality of pixels, and determining the movement speed of each of the detected one or more people in the video stream may include determining a measure of distance of movement (e.g. pixels moved) of the corresponding person from a first video frame to a second video frame of the video stream, wherein a time between when the first video frame was captured and when the second video frame was captured is known (e.g. known Frames-Per-Second).

In some cases, the measure of distance of movement may be expressed as a number of pixels that the corresponding person has moved from the first video frame to the second video frame. Determining the measure of size of each of the detected one or more people in the video stream may include determining a number of pixels that correspond to the corresponding person, and wherein the determined movement speed of each of the detected one or more people is normalized with respect to the number of pixels that correspond to that person.

An average of the movement speeds of all of the detected one or more people is determined for each of a plurality of video frame of the video stream, resulting in a plurality of frame average movement speeds, as indicated at block 100. A typical frame average movement speed is determined from the plurality of frame average movement speeds, as indicated at block 102.

In the illustrative example, and continuing with FIG. 5B, the plurality of frame average movement speeds are binned into a plurality of bins, as indicated at block 104. The bin of the plurality of bins having the most frame average movement speeds is selected, as indicated at block 106. The ambient speed is determined based on one or more of the plurality of frame average movement speeds of the selected bin, as indicated at block 108. In some cases, the ambient speed is determined based on an average of the plurality of frame average movement speeds of the selected bin. In some cases, the number of bins may be set based on the number of frame average movement speeds that are in the plurality of frame average movement speeds. That is, the more frame average movement speeds that are in the plurality of frame average movement speeds, the more bins may be used. In some cases, the number of bins may be set according to the Sturges Rule.

The average of the movement speeds of all of the detected people is compared to the ambient speed, as indicated at block 110. While not required, the ambient speed may be learned over time based at least in part on the average of the movement speeds of all of the detected one or more people determined over a plurality of video frames of the video stream over a learned period of time.

A determination is made that erratic behavior exists when the average of the movement speeds of all of the detected one or more people exceeds the ambient speed by at least a threshold, as indicated at block 112. In some cases, the threshold is time and/or location dependent, and may change over time. In some instances, the threshold is based at least in part on a sensitivity factor and a granularity factor that together define a trigger point for determining when the erratic movement alert is output, wherein the sensitivity factor and the granularity factor are user programmable (see FIGS. 13A-13B and 14).

When a determination is made that erratic behavior exists, an erratic movement alert is outputted, as indicated at block 114. An erratic movement alert may include a visual or audible alert for a person who is responsible for monitoring the video streams. An erratic movement alert may include superimposing a live video clip of the possible erratic behavior atop the person's screen so that they are immediately made aware of it. An erratic movement alert may include notifying the authorities, and possible dispatching the authorities to the location of the detected erratic behavior.

In some cases, outputting an erratic movement alert may cause one or more of adjusting a FOV of a video camera, prioritizing a video console to show the video stream that shows the erratic behavior, sending at least part of the video stream that includes the erratic behavior to a cloud server for further video processing (e.g. facial recognition, enhanced motion analysis, image enhancement, etc.) and/or archiving, and sending metadata associated with the erratic behavior to the cloud server.

Figure 6:
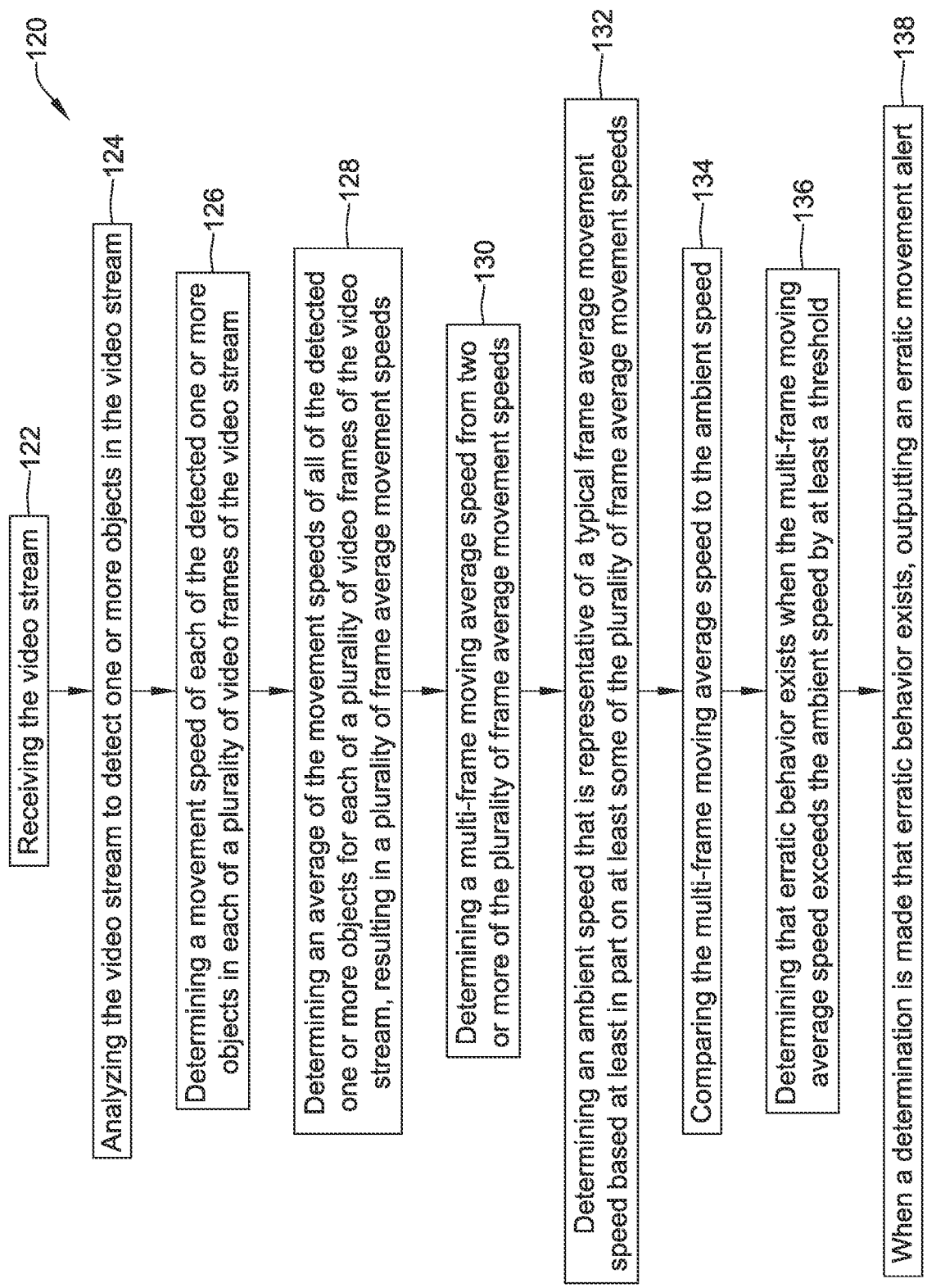
FIG. 6 is a flow diagram showing an illustrative method.

FIG. 6 is a flow diagram showing an illustrative method 120 of using a computing device having one or more processors to detect erratic behavior of one or more objects captured in a video stream of a video camera (such as the video cameras 14). The illustrative method 120 may be carried out via any of the one or more processors 16 within each of the video cameras 14, via the one or more processors 20 within the gateway 18 and/or via the one or more processors 24 within the cloud-based server 22. In some instances, the illustrative method 120 may be distributed between two or more of the video cameras 14, the gateway 18 and the cloud-based server 22. In some cases, less intensive video processing, requiring less computing power, may be performed within one or more of the video cameras 14. In some cases, two or more video cameras 14 may work together to process a video stream provided by one of the video cameras 14, for example. In some cases, more intensive video processing, requiring additional computing power, may be performed either within the gateway 18 or the cloud-based server 22. The gateway 18 and/or the cloud-based server 22 may be configured to optimize efficiency by controlling what video processing is performed by what processors.

The illustrative method 120 includes receiving the video stream, as indicated at block 122. Receiving the video stream may simply include the one or more processors 16 of the particular video camera 14 receiving the video stream provided by that video camera 14, or perhaps provided by another video camera 14 if the two video cameras 14 are load-sharing. Receiving the video stream may include the gateway 18 receiving the video stream, or perhaps the cloud-based server 22 receiving the video stream.

The video stream is analyzed to detect one or more objects in the video stream, as indicated at block 124. The one or more objects may include people, vehicles, animals, and/or any other object. A movement speed of each of the detected one or more objects is determined in each of a plurality of video frames of the video stream, as indicated at block 126. An average of the movement speeds of all of the detected one or more objects is determined for each of the plurality of video frames of the video stream, resulting in a plurality of frame average movement speeds, as indicated at block 128. A multi-frame moving average speed is determined from two or more of the plurality of frame average movement speeds, as indicated at block 130. An ambient speed that is representative of a typical frame average movement speed is determined based at least in part on at least some of the plurality of frame average movement speeds, as indicated at block 132. The multi-frame moving average speed is compared to the ambient speed, as indicated at block 134.

A determination is made that erratic behavior exists when the multi-frame moving average speed exceeds the ambient speed by at least a threshold, as indicated at block 136. When a determination is made that erratic behavior exists, an erratic movement alert is outputted, as indicated at block 138. In some cases, outputting an erratic movement alert may cause one or more of adjusting a FOV of a video camera, prioritizing a video console to show the video stream that shows the erratic behavior, sending at least part of the video stream that includes the erratic behavior to a cloud server for further video processing (e.g. facial recognition, enhanced motion analysis, image enhancement, etc.) and/or archiving, and sending metadata associated with the erratic behavior to the cloud server.

Figure 7A:
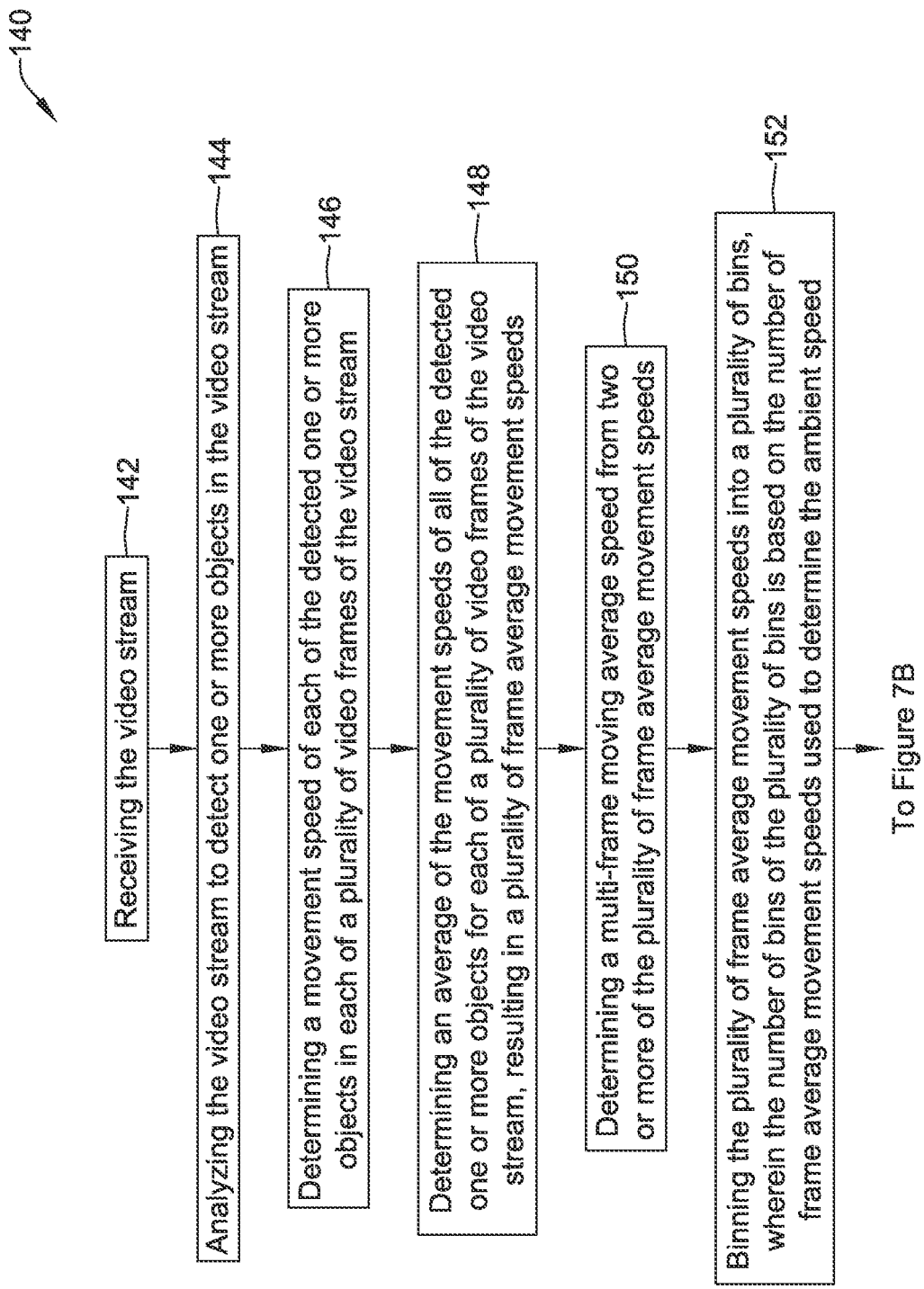
FIGS. 7A and 7B together are a flow diagram showing an illustrative method.
Figure 7B:
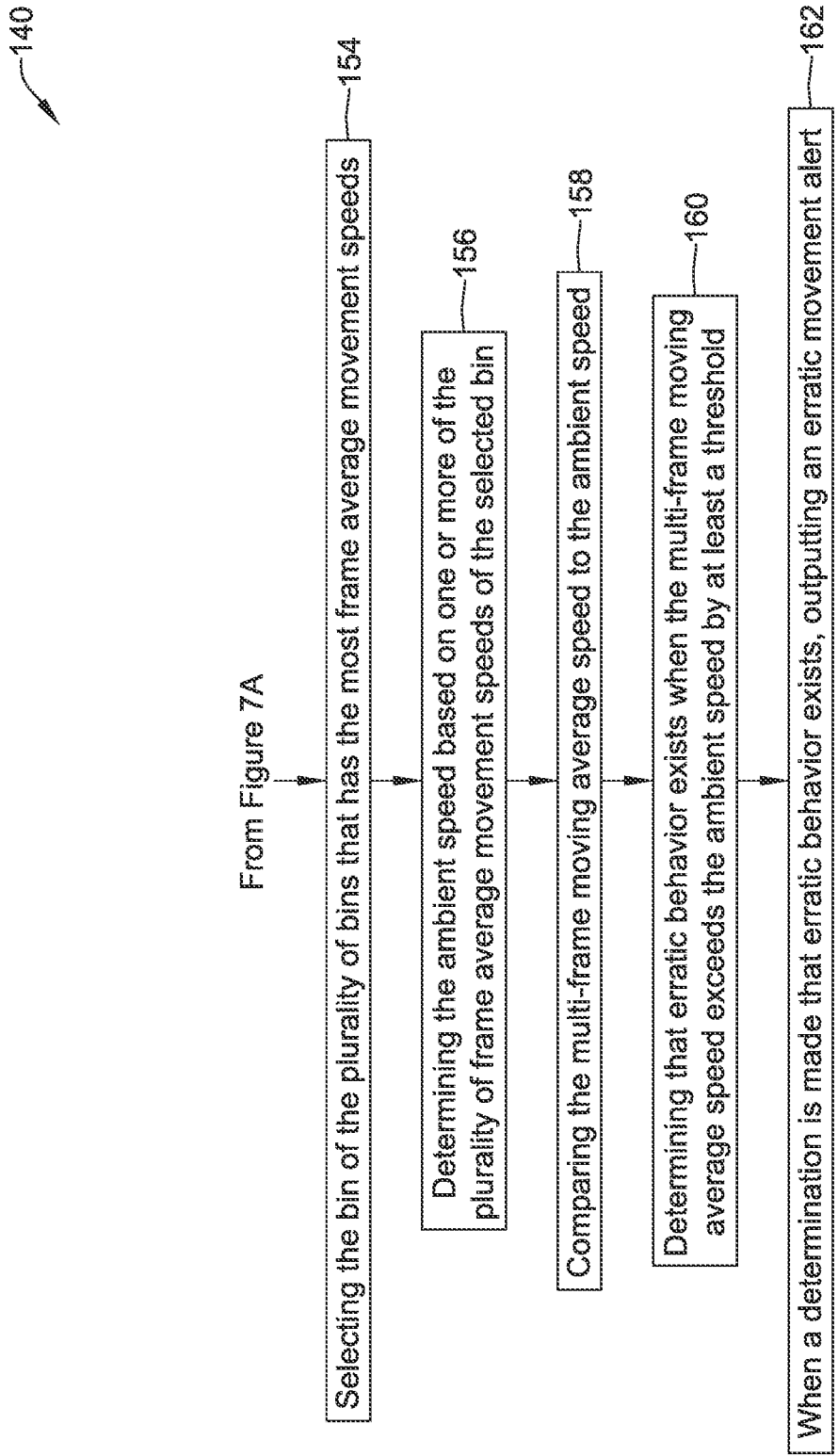

FIGS. 7A and 7B together are a flow diagram showing an illustrative method 140 of using a computing device having one or more processors to detect erratic behavior of one or more objects captured in a video stream of a video camera (such as the video cameras 14). The illustrative method 140 may be carried out via any of the one or more processors 16 within each of the video cameras 14, via the one or more processors 20 within the gateway 18 and/or via the one or more processors 24 within the cloud-based server 22. In some instances, the illustrative method 140 may be distributed between two or more of the video cameras 14, the gateway 18 and the cloud-based server 22. In some cases, less intensive video processing, requiring less computing power, may be performed within one or more of the video cameras 14. In some cases, two or more video cameras 14 may work together to process a video stream provided by one of the video cameras 14, for example. In some cases, more intensive video processing, requiring additional computing power, may be performed either within the gateway 18 or the cloud-based server 22. The gateway 18 and/or the cloud-based server 22 may be configured to optimize efficiency by controlling what video processing is performed by what processors.

Starting with FIG. 7A, the illustrative method 140 includes receiving the video stream, as indicated at block 142. Receiving the video stream may simply include the one or more processors 16 of the particular video camera 14 receiving the video stream provided by that video camera 14, or perhaps provided by another video camera 14 if the two video cameras 14 are load-sharing. Receiving the video stream may include the gateway 18 receiving the video stream, or perhaps the cloud-based server 22 receiving the video stream.

The video stream is analyzed to detect one or more objects in the video stream, as indicated at block 144. A movement speed of each of the detected one or more objects is determined in each of a plurality of video frames of the video stream, as indicated at block 146. An average of the movement speeds of all of the detected one or more objects is determined for each of the plurality of video frames of the video stream, resulting in a plurality of frame average movement speeds, as indicated at block 148. A multi-frame moving average speed is determined from two or more of the plurality of frame average movement speeds, as indicated at block 150.

The plurality of frame average movement speeds are binned into a plurality of bins, wherein the number of bins of the plurality of bins is based on the number of frame average movement speeds used to determine the ambient speed, as indicated at block 152. Continuing with FIG. 7B, the bin of the plurality of bins that has the most frame average movement speeds is selected, as indicated at block 154. The ambient speed is determined based on one or more of the frame average movement speeds of the selected bin (e.g. average), as indicated at block 156. The multi-frame moving average speed is compared to the ambient speed, as indicated at block 158.

A determination is made that erratic behavior exists when the multi-frame moving average speed exceeds the ambient speed by at least a threshold, as indicated at block 160. When a determination is made that erratic behavior exists, an erratic movement alert is outputted, as indicated at block 162. In some cases, outputting an erratic movement alert may cause one or more of adjusting a FOV of a video camera, prioritizing a video console to show the video stream that shows the erratic behavior, sending at least part of the video stream that includes the erratic behavior to a cloud server for further video processing (e.g. facial recognition, enhanced motion analysis, image enhancement, etc.) and/or archiving, and sending metadata associated with the erratic behavior to the cloud server.

Figure 8:
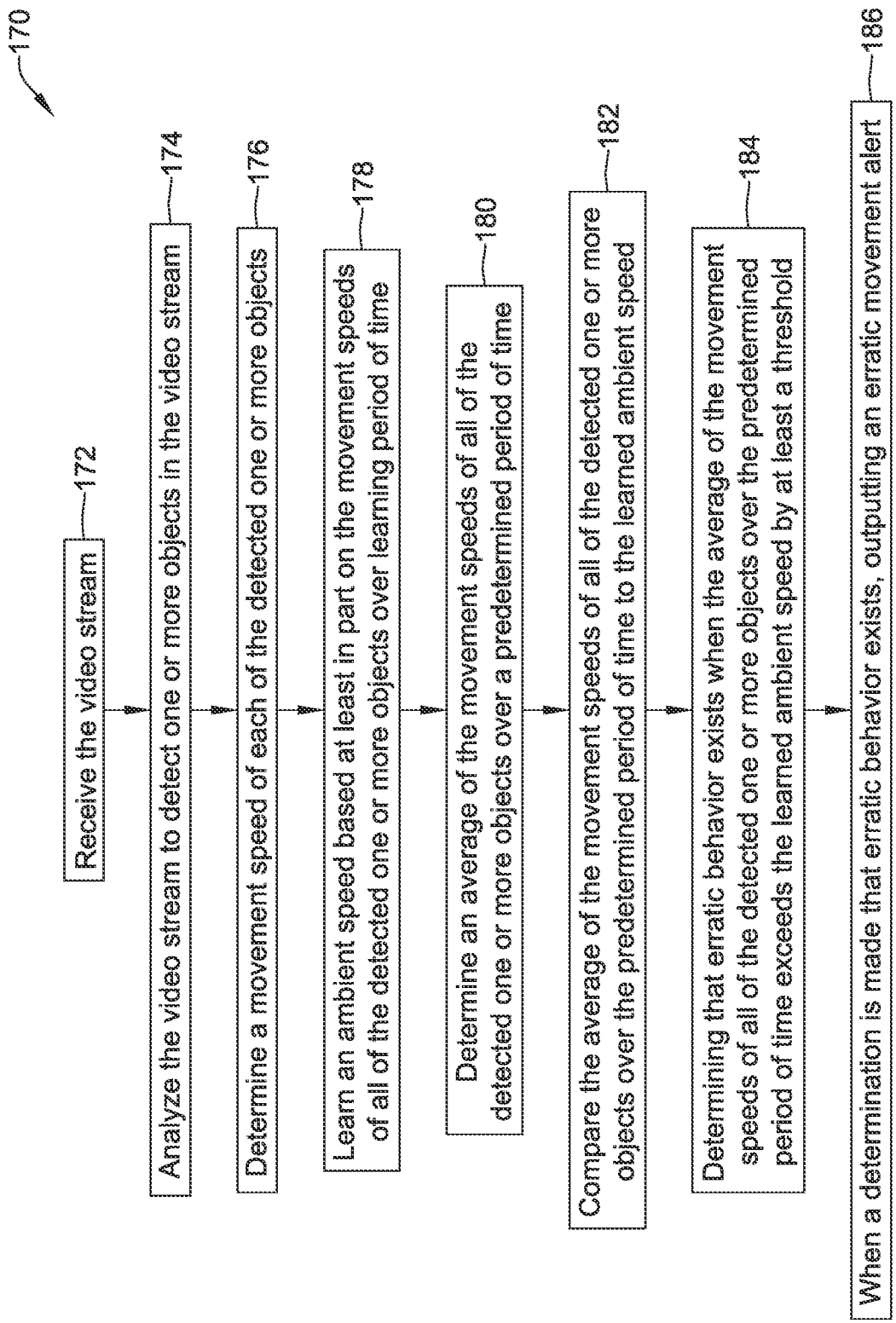
FIG. 8 is a flow diagram showing an illustrative series of steps that one or more processors of a computing device may carry out upon execution of instructions.

FIG. 8 is a flow diagram showing a series of steps 170 that may be carried out by one or more processors such as but not limited to the one or more processors 16 of the video cameras 14, the one or more processors 20 of the gateway 18, and/or the one or more processors 24 of the cloud-based server 22 when executing executable instructions. The one or more processors may be caused to receive a video stream, as indicated at block 172. Receiving the video stream may simply include the one or more processors 16 of the particular video camera 14 receiving the video stream provided by that video camera 14, or perhaps provided by another video camera 14 if the two video cameras 14 are load-sharing. Receiving the video stream may include the gateway 18 receiving the video stream, or perhaps the cloud-based server 22 receiving the video stream.

The one or more processors are caused to analyze the video stream to detect one or more objects in the video stream, as indicated at block 174. The one or more processors are caused to determine a movement speed of each of the detected one or more objects, as indicated at block 176. The one or more processors are caused to learn an ambient speed based at least in part on the movement speeds of all of the detected one or more objects over learning period of time, as indicated at block 178. The one or more processors are caused to determine an average of the movement speeds of all of the detected one or more objects over a predetermined period of time, as indicated at block 180. The one or more processors are caused to compare the average of the movement speeds of all of the detected one or more objects over the predetermined period of time to the learned ambient speed, as indicated at block 182. The one or more processors are caused to determine that erratic behavior exists when the average of the movement speeds of all of the detected one or more objects over the predetermined period of time exceeds the learned ambient speed by at least a threshold, as indicated at block 184. When a determination is made that erratic behavior exists, an erratic movement alert is outputted, as indicated at block 186.

Figure 9:
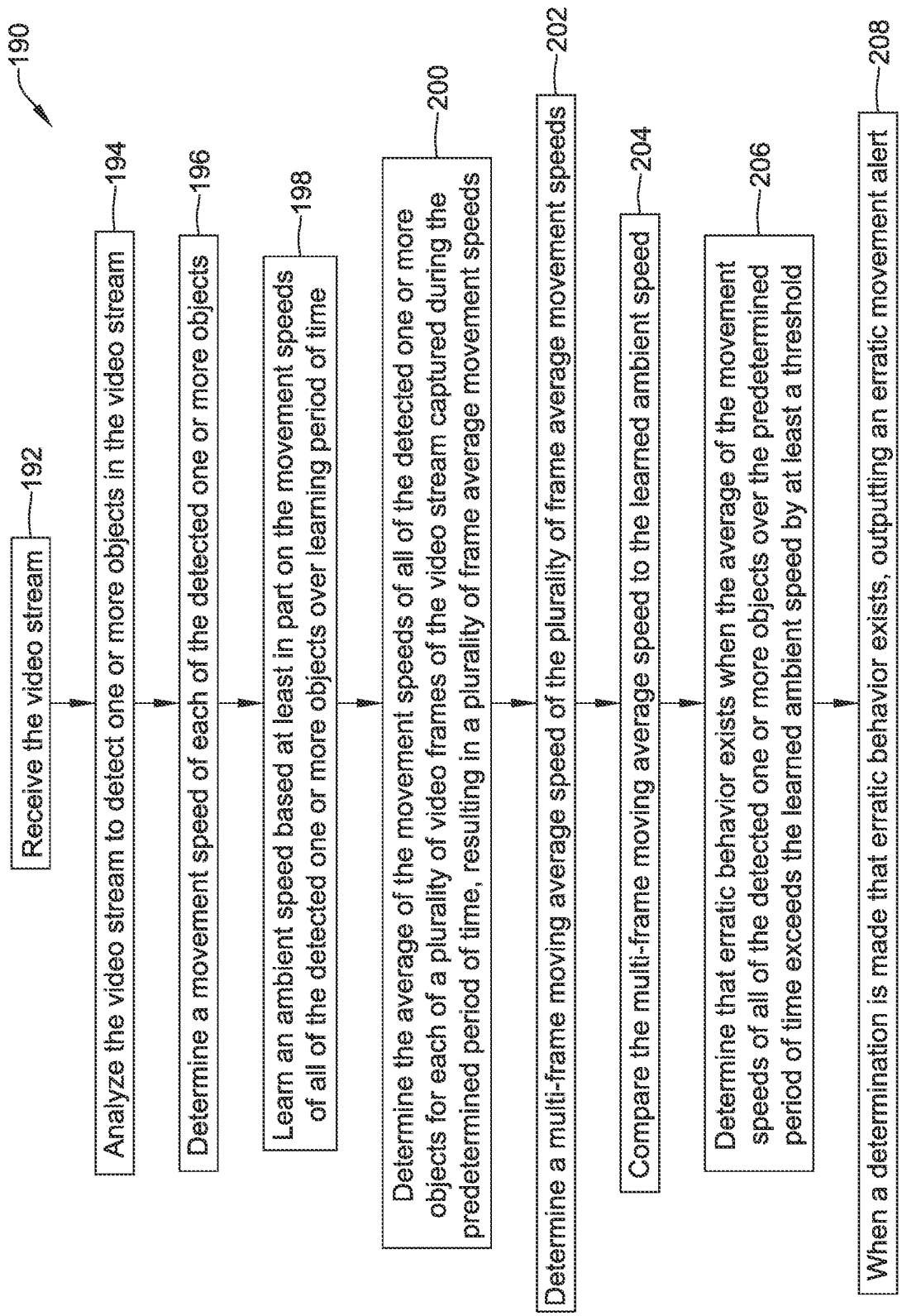
FIG. 9 is a flow diagram showing an illustrative series of steps that one or more processors of a computing device may carry out upon execution of instructions.

FIG. 9 is a flow diagram showing a series of steps 190 that may be carried out by one or more processors such as but not limited to the one or more processors 16 of the video cameras 14, the one or more processors 20 of the gateway 18, and/or the one or more processors 24 of the cloud-based server 22 when executing executable instructions. The one or more processors may be caused to receive a video stream, as indicated at block 192. Receiving the video stream may simply include the one or more processors 16 of the particular video camera 14 receiving the video stream provided by that video camera 14, or perhaps provided by another video camera 14 if the two video cameras 14 are load-sharing. Receiving the video stream may include the gateway 18 receiving the video stream, or perhaps the cloud-based server 22 receiving the video stream.

The one or more processors are caused to analyze the video stream to detect one or more objects in the video stream, as indicated at block 194. The one or more processors are caused to determine a movement speed of each of the detected one or more objects, as indicated at block 196.

The one or more processors are caused to learn an ambient speed based at least in part on the movement speeds of all of the detected one or more objects over learning period of time, as indicated at block 198. The one or more processors are caused to determine the average of the movement speeds of all of the detected one or more objects for each of a plurality video frames of the video stream captured during the predetermined period of time, resulting in a plurality of frame average movement speeds, as indicated at block 200. The one or more processors are caused to determine a multi-frame moving average speed of the plurality of frame average movement speeds, as indicated at block 202. The one or more processors are caused to compare the multi-frame moving average speed to the learned ambient speed, as indicated at block 204.

The one or more processors are caused to determine that erratic behavior exists when the average of the movement speeds of all of the detected one or more objects over the predetermined period of time exceeds the learned ambient speed by at least a threshold, as indicated at block 206. When a determination is made that erratic behavior exists, an erratic movement alert is outputted, as indicated at block 208.

Figure 10:
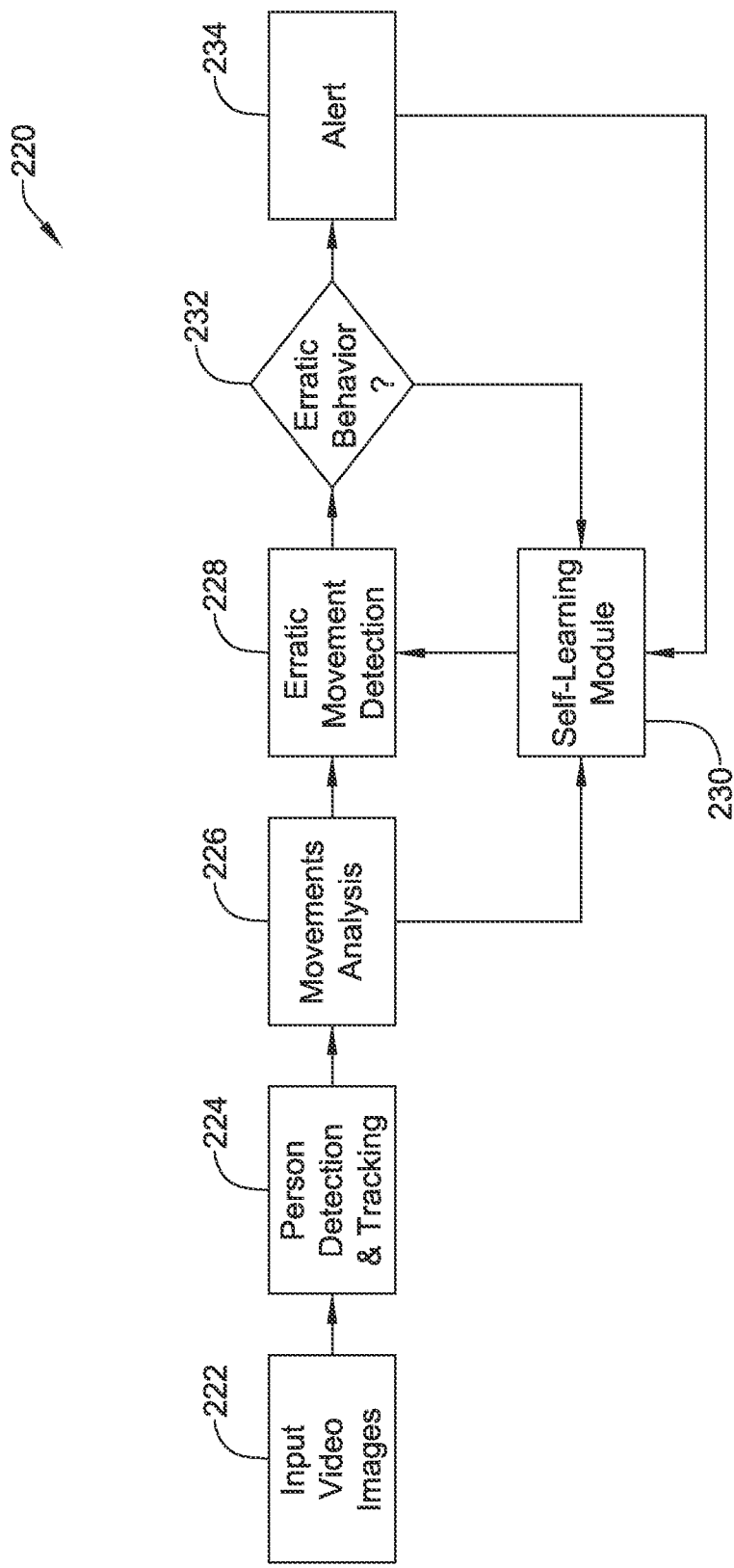
FIG. 10 is a flow diagram showing an illustrative method.

FIG. 10 is a flow diagram showing an illustrative method 220 for detecting erratic behavior within a video stream. It will be appreciated that the method 220 may be carried out via the one or more processors 16 within each of the video cameras 14, via the one or more processors 20 within the gateway 18 and/or via the one or more processors 24 within the cloud-based server 22. In some instances, the method 220 may be distributed between two or more of the video cameras 14, the gateway 18 and the cloud-based server 22. In some cases, less intensive video processing, requiring less computing power, may be performed within one or more of the video cameras 14. In some cases, two or more video cameras 14 may work together to process a video stream provided by one of the video cameras 14, for example. In some cases, more intensive video processing, requiring additional computing power, may be performed either within the gateway 18 or the cloud-based server 22. The gateway 18 and/or the cloud-based server 22 may be configured to optimize efficiency by controlling what video processing is performed by what processors.

At block 222, video images are inputted and received. Receiving the video stream may simply include the one or more processors 16 of the particular video camera 14 receiving the video stream provided by that video camera 14, or perhaps provided by another video camera 14 if the two video cameras 14 are load-sharing. Receiving the video stream may include the gateway 18 receiving the video stream, or perhaps the cloud-based server 22 receiving the video stream.

At block 224, person detection and tracking occurs. This may include any of a variety of known algorithms for detecting people within a video stream, as well as for tracking a detected person from frame to frame. At block 226, movement analysis occurs. This may include, for example, determining how fast a person is moving by comparing their movement frame to frame relative to the frame rate. If the person moves one inches from one frame to the next, at a frame rate of thirty frames per second, that means the person moved one inch in ⅟30 of a second. This translates into a movement speed of 150 feet per minute, or 1.7 miles per hour (mph).

Block 228 corresponds to an erratic movement detection block that receives information from the movement analysis at block 226 as well as from self-learning at block 230. The self-learning block 230 learns what normal movement looks like, and thus can provide insight to the erratic movement detection algorithms at block 228. It will be appreciated that what normal movement looks like can vary from location to location, from day to day, from time to time. What normally happens, and what is expected at a train station at 5 pm on a Tuesday is significantly different than what normally happens at that train station at 11 pm on Tuesday. What normally happens, and what is expected at a bus park and ride at 7 am on a Monday is significantly different than what normally happens at that same bus park and ride at 7 am on a Saturday. These are just examples.

At decision block 232, a determination is made as to whether erratic behavior is detected. This may be achieved by recognizing that people's detected movements are different than what is expected. Seeing a person running for a train may be expected; seeing a crowd of people all running away from that same train is not expected, and may be construed as erratic. In some cases, erratic behavior may be suspected when people are moving faster than expected, slower than expected, abruptly change direction or speed, abruptly raise their hands, stampede, or perform some other erratic behavior. If erratic behavior is suspected or detected, an alert may be raised, as indicated at block 234.

Figure 11:
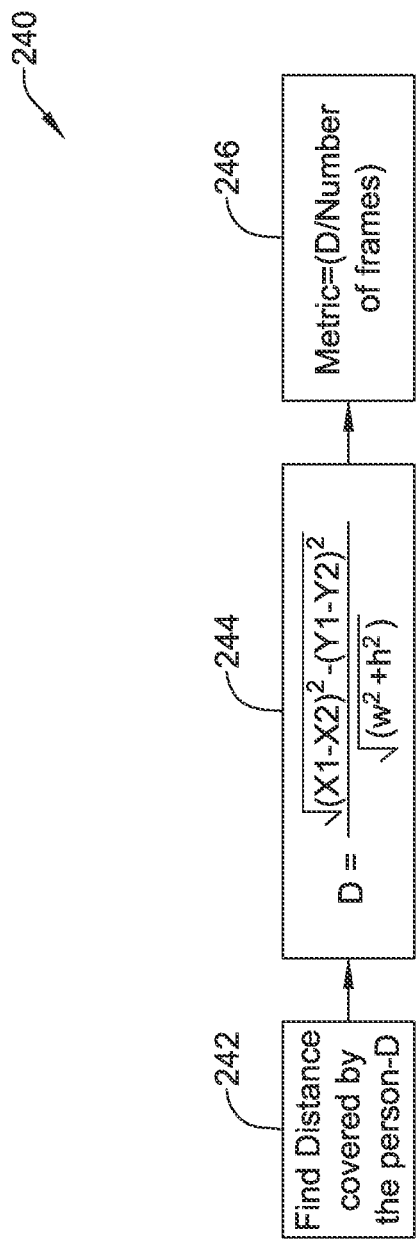
FIG. 11 is a flow diagram showing an illustrative method.

FIG. 11 is a flow diagram showing an illustrative method 240 of determining how fast a detected person is moving within a video stream. As indicated at block 242, the first step is to determine the distance that the person traveled from one frame to the next frame, or to a subsequent frame that is two or more frames away. The distance D may be determined in a perspective view, and in accordance with the equation given at block 244. In this, (X1, Y1) refers to the person's relative position (e.g. pixel position) in a first frame and (X2, Y2) refers to their relative position (e.g. pixel position) in the next frame. In the equation, "w" and "h" refer to an apparent width and an apparent height of the person within a video frame, or to the apparent width and apparent height of a bounding box that bounds the person. Width and height may be measured in any suitable dimensions. In some cases, width and height may be measured in pixels.

This equation gives an Euclidean distance, and is normalized by the relative size of the person (or the bounding box). It will be appreciated that for a person of a given size, they will appear larger if located closer to the camera, and will appear smaller if located farther away from the camera. For two people moving at the same speed, the person in the foreground may move ten pixels from a first frame to a second frame, while the person in the background may move only five pixels from the first frame to the second frame. However, the person in the foreground (or their bounding box) will have a width "w" and height "h" that is greater than the width and height of the person in the background. The person speed may thus be normalized with respect to the person size ("w" and "h") to arrive at a measure that represents the physical speed of the person in the space. At block 246, a metric is determined that represents the person's speed.

Figure 12:
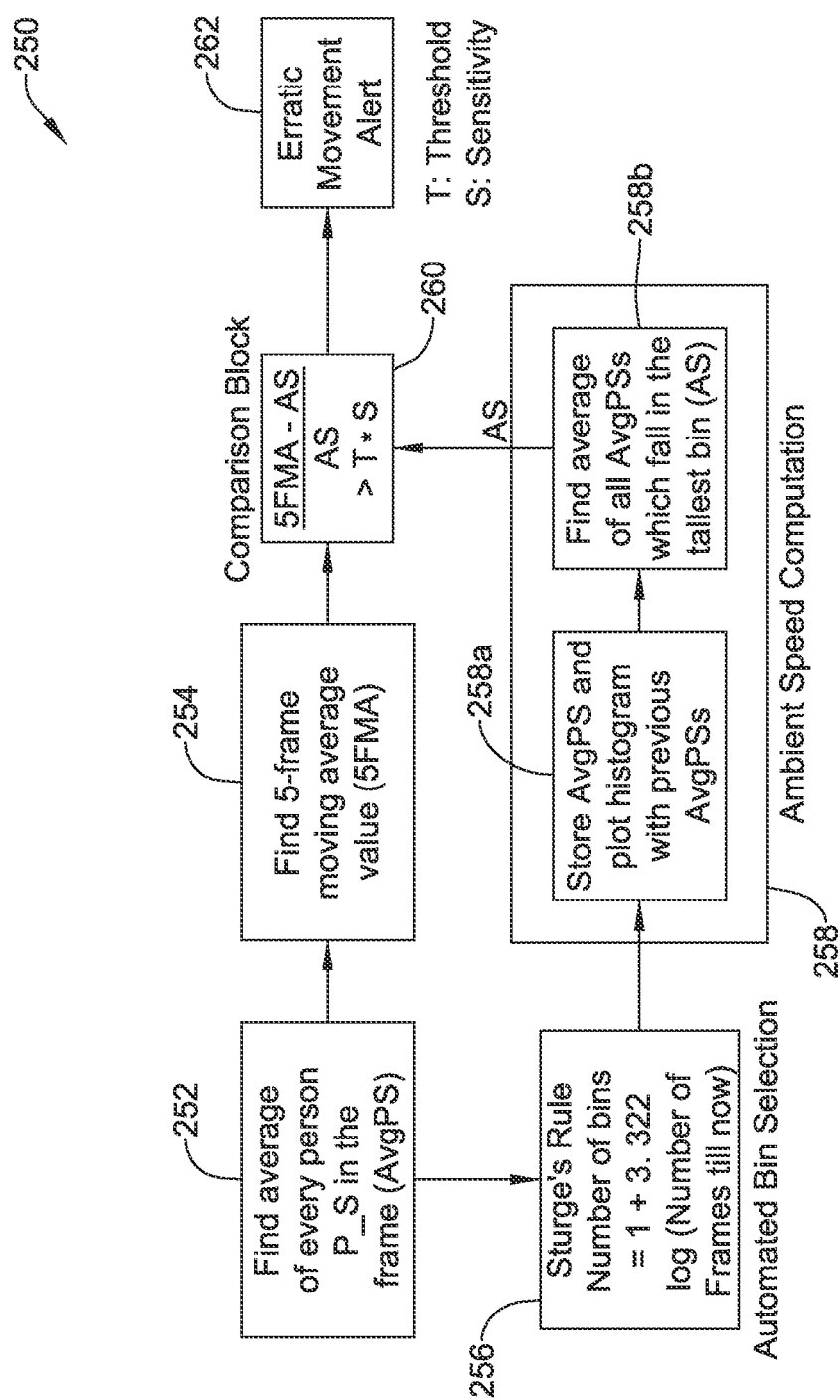
FIG. 12 is a flow diagram showing an illustrative method.

FIG. 12 is a flow diagram showing an illustrative method 250 of detecting erratic behavior. At block 252, the variable AvePS is determined. The AvePS is the average speed of every person's personal speed in the particular frame. At block 254, the variable 5FMA, which represents a five-frame moving average, is calculated. Block 256 represents automated bin selection, which relies upon Sturge's rule to determine how many bins should be used.

At block 258, an ambient speed is calculated. The block 258 may be considered as a self-learning block that, over time, learns what is normal for a particular location. What is normal for the particular location may vary from day to day, for example, or even from time to time. The block 258 includes a block 258*a*, at which the AvePS values are stored and are plotted as a histogram (binned) with previous AvePS values. At block 258*b*, the AS (ambient speed) is calculated by finding an average of all the AvePS values that fall into the tallest bin (i.e. the bin with the most speeds in that particular bin).

At block 260, a comparison is made between the five-frame moving average 5FMA and the ambient speed AS, tempered by a sensitivity variable S and a trigger threshold variable T. If the ratio of (5FMA−AS)/AS is greater than T times S, an erratic movement alert is generated at block 262. In some cases, one or both of the threshold variable T and the sensitivity variable S are user-selectable.

Figure 13A:
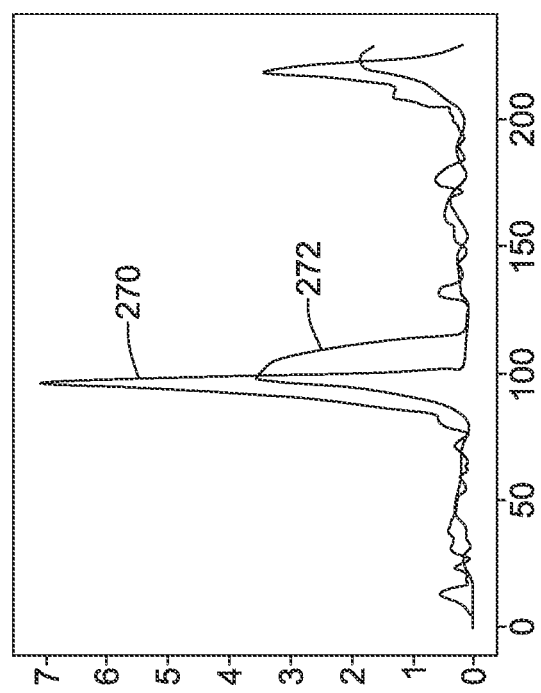
FIGS. 13A-B show an example of a user adjustable threshold for identifying erratic behavior in a video stream.
Figure 13B:
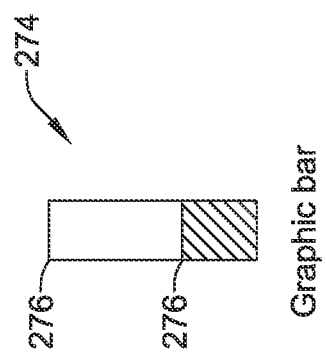

FIGS. 13A and 13B provide an example of the sensitivity variable S and a trigger threshold variable T. FIG. 13A is a graph showing number of elapsed frames along the X axis and example values of (5FMA−AS)/AS along the Y axis, plotted as a graphic line 270. As another example, graphic line 272 shows a value generated using a different frame moving average (e.g. 10FMA). FIG. 13B shows a graphic bar 274 having a maximum height $M_H$ 276. The maximum height $M_H$ 276 represents a range of (5FMA−AS)/AS values that is scaled according to the sensitivity variable S. A current value bar $R_H$ 278 represents the current value of (5FMA−AS)/AS relative to the range of (5FMA−AS)/AS values represented by the maximum height $M_H$ 276. To provide a numerical example, in some cases the sensitivity variable can vary from 1 to 10, and may be user configurable. Say that the user inputs a sensitivity variable S=2. This means that the maximum height $M_H$ (height 276) of the graphic bar 274 is set equal to a value of 2. If we assume that the current value of (5FMA−AS)/AS is 0.8, then the current value bar $R_H$ 278 will be set equal to 0.8/2=0.4=40% of the maximum height $M_H$ 276 as shown. If the user were to change the sensitivity variable, say to S=4, and the current value for (5FMA−AS)/AS remains the same at 0.8, then the current value bar $R_H$ 278 would be set equal to 0.8/4=0.2=20% of the maximum height $M_H$ 276, and the current value bar $R_H$ 278 would be shown as being 40 percent of the maximum height $M_H$ 276.

The trigger threshold variable T may be set between 0% and 100%. The trigger threshold variable T may represent the percent the current value bar $R_H$ 278 must reach relative to the maximum height $M_H$ 276 before an alert is triggered. Continuing with the example above, if the trigger threshold variable T were set at 80%, and the sensitivity variable S were set equal to 2, the current value of (5FMA−AS)/AS would need to reach a value of 1.6 before an alert is triggered. The combination of S and T provide the user with flexibility in identifying erratic behavior in a video stream.

Figure 14:
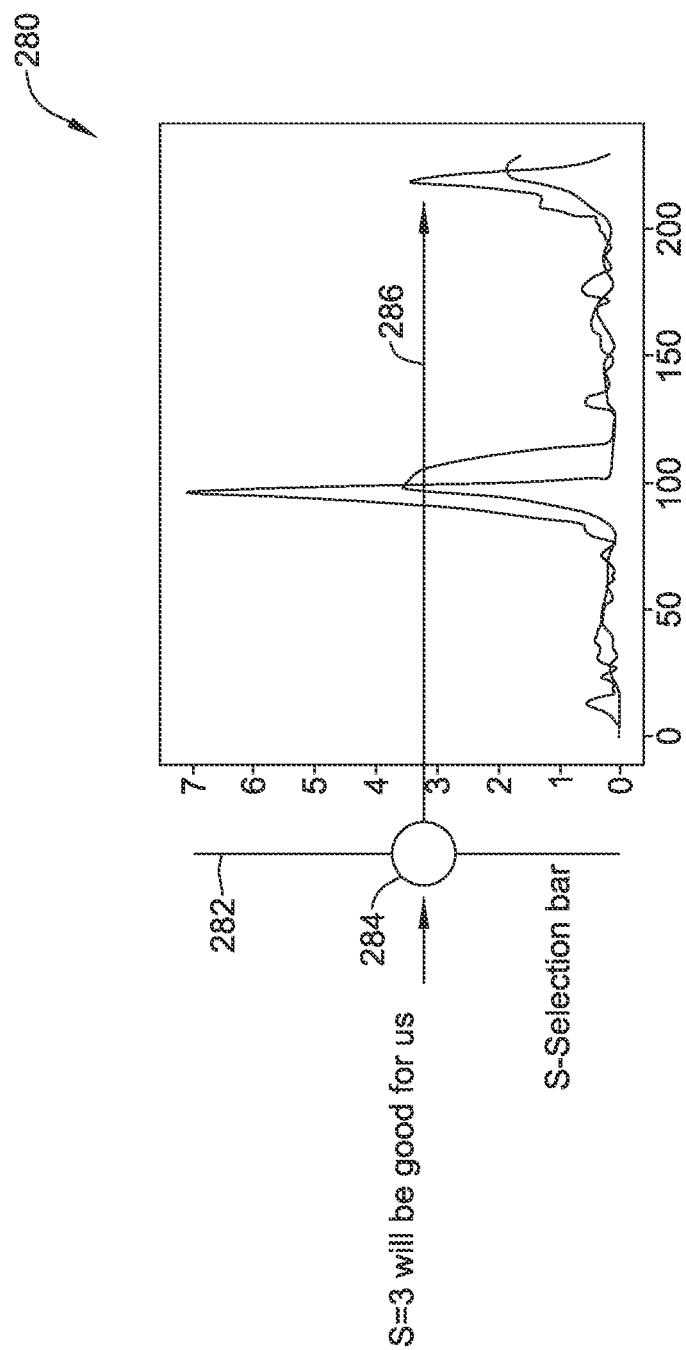
FIG. 14 is a graphical example of setting a sensitivity parameter of the user adjustable threshold of FIGS. 13A-13B.

In some cases, and to help a user select a value for the sensitivity variable S, a graph 280 similar to that shown in FIG. 13A may be displayed to a user, as seen in FIG. 14. A selection bar 282 may be displayed alongside the Y-axis of the graph 280 for selecting the value of the sensitivity variable S. The illustrative selection bar 282 includes a selection point 284 that may be slid up and down by the user, which sets the sensitivity variable S. A horizontal line 286 correlates to the current position of the selection point 284, and allows the user to compare the position of the selection point 284 relative to the historical (and current) values for (5FMA−AS)/AS to help the user select a desired value for sensitivity variable S. In the example shown, the user has selected a value of 3.1 for the sensitivity variable S.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A method of using a computing device having one or more processors to detect erratic behavior of one or more people captured in a video stream of a video camera, the method comprising:
   receiving the video stream;
   analyzing the video stream to detect one or more people in the video stream;
   determining a measure of size in the video stream of each of the detected one or more people;
   determining a movement speed of each of the detected one or more people, wherein the movement speed of each of the detected one or more people is normalized with respect to the determined measure of size of that person in the video stream;
   determining an average of the movement speeds of the detected one or more people for each of a plurality video frames of the video stream, resulting in a plurality of frame average movement speeds;
   determining a multi-frame moving average of the plurality of frame average movement speeds;
   comparing the multi-frame moving average of the movement speeds of the detected one or more people to a typical speed;

determining that erratic behavior exists when the multi-frame moving average of the movement speeds of the detected one or more people exceeds the typical speed by at least a threshold; and when a determination is made that erratic behavior exists, outputting an erratic movement alert.

2. The method of claim 1, wherein the video stream comprises a plurality of video frames, wherein each video frame includes a plurality of pixels, wherein determining the measure of size in the video stream of each of the detected one or more people comprises determining a number of pixels that correspond to the corresponding person.

3. The method of claim 1, further comprising:
determining a bounding box for each of the detected one or more people in the video stream that bounds at least part of the corresponding person; and
determining the measure of size in the video stream of each of the detected one or more people based on a size of the corresponding bounding box.

4. The method of claim 1, wherein the video stream comprises a plurality of video frames and each video frame includes a plurality of pixels, and wherein determining the movement speed of each of the detected one or more people in the video stream comprises determining a measure of distance of movement of the corresponding person from a first video frame to a second video frame of the video stream, wherein a time between when the first video frame was captured and when the second video frame was captured is known.

5. The method of claim 4, wherein the measure of distance of movement is expressed as a number of pixels that the corresponding person has moved from the first video frame to the second video frame.

6. The method of claim 4, wherein determining the measure of size of each of the detected one or more people in the video stream comprises determining a number of pixels that correspond to the corresponding person, and wherein the determined movement speed of each of the detected one or more people is normalized with respect to the number of pixels that correspond to that person.

7. The method of claim 1, wherein the typical speed is learned over time based at least in part on the average of the movement speeds of the detected one or more people determined over a plurality of video frames of the video stream.

8. The method of claim 1, further comprising:
determining the average of the movement speeds of the detected one or more people for each of a plurality of video frames of the video stream, resulting in a plurality of frame average movement speeds;
determining a typical frame average movement speed from the plurality of frame average movement speeds; and
setting the typical speed based at least in part on the typical frame average movement speed.

9. The method of claim 8, wherein the threshold is based at least in part on a sensitivity factor and a granularity factor that together define a trigger point for determining when the erratic movement alert is output, wherein the sensitivity factor and the granularity factor are user programmable.

10. The method of claim 8, further comprising:
binning the plurality of frame average movement speeds into a plurality of bins;
selecting the bin of the plurality of bins that has the most frame average movement speeds; and
determining the typical speed based on one or more of the plurality of frame average movement speeds of the selected bin.

11. The method of claim 10, further comprising:
determining a number of bins of the plurality of bins based on the number of frame average movement speeds that are in the plurality of frame average movement speeds.

12. The method of claim 1, wherein the threshold is time dependent and changes over time.

13. The method of claim 1, wherein the video camera has a field of view, and analyzing the video stream to detect one or more people in the video stream comprises:
identifying a region of interest in the video stream, wherein the region of interest corresponds to less than the entire field of view of the video camera; and
detecting one or more people in the region of interest of the video stream while not detecting people that are not in the region of interest of the video stream.

14. A method of using a computing device having one or more processors to detect erratic behavior of one or more objects captured in a video stream of a video camera, the method comprising:
receiving the video stream;
analyzing the video stream to detect one or more objects in the video stream;
determining a movement speed of each of the detected one or more objects in each of a plurality of video frames of the video stream;
determining an average of the movement speeds of the detected one or more objects for each of the plurality of video frames of the video stream, resulting in a plurality of frame average movement speeds;
determining a multi-frame moving average speed from two or more of the plurality of frame average movement speeds;
determining a typical speed that is representative of a typical frame average movement speed based at least in part on at least some of the plurality of frame average movement speeds;
comparing the multi-frame moving average speed to the typical speed;
determining that erratic behavior exists when the multi-frame moving average speed exceeds the typical speed by at least a threshold; and
when a determination is made that erratic behavior exists, outputting an erratic movement alert.

15. The method of claim 14, further comprising:
binning the plurality of frame average movement speeds into a plurality of bins, wherein the number of bins of the plurality of bins is based on the number of frame average movement speeds used to determine the typical speed;
selecting the bin of the plurality of bins that has the most frame average movement speeds; and
determining the typical speed based on one or more of the frame average movement speeds of the selected bin.

16. The method of claim 14, wherein outputting an erratic movement alert causes one or more of adjusting a FOV of the video camera, prioritizing a video console to show the video stream that shows the erratic behavior, sending at least part of the video stream that includes the erratic behavior to a cloud server for further video processing and/or archiving, and sending metadata associated with the erratic behavior to the cloud server.

17. A non-transient computer readable medium storing instructions that when executed by one or more processors cause the one or more processors to:
   receive a video stream;
   analyze the video stream to detect one or more objects in the video stream;
   determine a movement speed of each of the detected one or more objects;
   learn a typical speed based at least in part on the movement speeds of the detected one or more objects over learning period of time;
   determine an average of the movement speeds of the detected one or more objects over a predetermined period of time;
   compare the average of the movement speeds of the detected one or more objects over the predetermined period of time to the learned typical speed;
   determine that erratic behavior exists when the average of the movement speeds of the detected one or more objects over the predetermined period of time exceeds the learned typical speed by at least a threshold; and
   when a determination is made that erratic behavior exists, output an erratic movement alert.

18. The non-transient computer readable medium of claim 17, further comprising instructions that when executed by one or more processors cause the one or more processors to:
   determine the average of the movement speeds of the detected one or more objects for each of a plurality video frames of the video stream captured during the predetermined period of time, resulting in a plurality of frame average movement speeds;
   determine a multi-frame moving average speed of the plurality of frame average movement speeds; and
   compare the multi-frame moving average speed to the learned typical speed.

19. The non-transient computer readable medium of claim 17, wherein the threshold is based at least in part on a sensitivity factor and a granularity factor that together define a trigger point for determining when the erratic movement alert is output, wherein the sensitivity factor and the granularity factor are user programmable.

* * * * *